United States Patent [19]

Koyama et al.

[11] Patent Number: 5,296,322
[45] Date of Patent: Mar. 22, 1994

[54] ELECTROPHOTOGRAPHIC PHOTOSENSITIVE MEMBER AND APPARATUS USING SAME

[75] Inventors: Takashi Koyama; Naoto Fujimura, both of Yokohama; Yuichi Hashimoto, Tokyo; Tetsuo Shiraiwa, Ikoma; Shigeo Mori, Kyoto, all of Japan

[73] Assignees: Canon Kabushiki Kaisha, Tokyo; Dai-Ichi Kogyo Seiyaku Co., Ltd., Kyoto, both of Japan

[21] Appl. No.: 830,862

[22] Filed: Feb. 4, 1992

[30] Foreign Application Priority Data

Feb. 4, 1991 [JP] Japan ................. 3-035711
Apr. 10, 1991 [JP] Japan ................. 3-103578

[51] Int. Cl.$^5$ .................................................. G03G 5/14
[52] U.S. Cl. ........................................ 430/58; 430/60; 430/62; 430/63; 430/64; 355/211; 358/300; 358/302
[58] Field of Search ............... 430/60, 62, 63, 64, 430/58; 355/211; 358/300, 302

[56] References Cited

U.S. PATENT DOCUMENTS

| 4,946,766 | 8/1990 | Fukagai ................. 430/60 |
| 5,079,117 | 1/1992 | Koyama et al. ......... 430/62 X |

FOREIGN PATENT DOCUMENTS

| 394142 | 10/1990 | European Pat. Off. |
| 402260 | 12/1990 | European Pat. Off. |
| 48-47344 | 7/1973 | Japan . |
| 51-126148 | 11/1976 | Japan . |
| 52-20836 | 2/1977 | Japan . |
| 52-25638 | 2/1977 | Japan . |
| 53-89435 | 8/1978 | Japan . |
| 55-103556 | 8/1980 | Japan . |
| 2-115858 | 4/1990 | Japan . |

OTHER PUBLICATIONS

Patent Abstracts of Japan, vol. 12, No. 147 [P-698] (2994) May 7, 1988.
Patent Abstracts of Japan, vol. 14, No. 337 ]P-1079] (4280) Jul. 20, 1990.

Primary Examiner—Roland Martin
Attorney, Agent, or Firm—Fitzpatrick, Cella, Harper & Scinto

[57] ABSTRACT

A photosensitive member suitable for use in an electrophotographic apparatus is constituted by an electroconductive support, and an intermediate layer and a photosensitive layer disposed in this order on the support. The intermediate layer comprises a reaction product of a polyol compound comprising at least one of a polyol compound [I] represented by Formula (1) shown below and a phosphated polyol compound with a polyisocyanate compound:

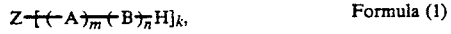

Formula (1)

wherein A denotes

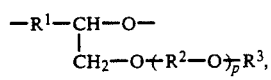

B denotes —$R^4$—O—, A and B may be connected at random or in blocks with each other, Z denotes an active hydrogen compound residue; $R^1$ is an alkylene group having 1-9 carbon atoms; $R^2$ is an alkylene group having 1-10 carbon atoms; $R^3$ is an alkyl group, alkenyl group, aryl group or aralkyl group having 1-20 carbon atoms; $R^4$ is an alkylene group having 2-10 carbon atoms; k is a number of 1-12 m is a number of 1-250; n is a number of 0-100; and p is a number of 0-5.

36 Claims, 1 Drawing Sheet

ELECTROPHOTOGRAPHIC PHOTOSENSITIVE MEMBER AND APPARATUS USING SAME

FIELD OF THE INVENTION AND RELATED ART

The present invention relates to an electrophotographic photosensitive member, particularly one having an improved intermediate layer disposed between an electroconductive support (hereinafter simply referred to as a "support") and a photosensitive layer, and also an apparatus using such an improved electrophotographic photosensitive member.

For an electrophotographic photosensitive member of the Carlson type, it is generally important to ensure stability of a dark-part potential and a light-part potential in order to secure a constant image density on repetition of charging-exposure and provide images free from fog.

In order to ensure the potential stability, various proposals have been made, inclusive of, e.g., improvement in charge injection from the support to the photosensitive layer, improvement in adhesion between the support and the photosensitive layer, improvement in application characteristic of the photosensitive layer, and provision of an intermediate layer between the support and the photosensitive layer having a function of, e.g., covering defects on the support.

There has been also proposed a photosensitive member having a photosensitive layer of a laminated structure functionally separated into a charge generation layer and a charge transport layer. The charge generation layer is generally formed in a very thin layer of, e.g., about 0.5 micron, so that the thickness of the charge generation layer is liable to be nonuniform due to defects soiling, attachment or flaws on the surface of the support. Such a nonuniform thickness of the charge generation layer, however, results in a sensitivity irregularity of the photosensitive member, so that the charge generation layer is required to be as uniform as possible.

In view of the above circumstances, it has been proposed to dispose an intermediate layer, between the charge generation layer and the support, functioning as a barrier layer and an adhesive layer and also covering defects on the support.

Hitherto, as resins constituting such intermediate layers between the photosensitive layer and the support there have been known to use polyamide (Japanese Laid-Open Patent Application (JP-A) 48-47344, JP-A 52-25638), polyester (JP-A 52-20836, JP-A 54-206738), polyurethane (JP-A 53-89435, JP-A H2-115858), quarternary ammonium salt-containing acrylic polymer (JP-A 51-126148), and casein (JP-A 55-103556).

However, an intermediate layer composed of a material as described above changes its electric resistance corresponding to changes in environmental temperature and humidity, so that it has been difficult to ensure a stable potential characteristic over wide environmental conditions ranging from low temperature-low humidity to high temperature-high humidity by using an electrophotographic photosensitive member incorporating such an intermediate layer.

For example, when such a photosensitive member is repeatedly used under low temperature-low humidity conditions tending to increase the electric resistance of the intermediate layer, some charges remain in the intermediate layer to increase the light-part potential and the residual potential, thus resulting in fog in copied images.

Further, in case where such a photosensitive member is used in an electrophotographic printer of the reversal development type, the resultant images are liable to be thin in density and fail to provide copies with a prescribed quality.

On the other hand, under high temperature-high humidity conditions, such an intermediate layer is liable to cause an inferior barrier function due to a lowering in electric resistance, thus resulting in a increase in carrier injection from the support side to cause a lowering in dark-part potential. As a result, under high temperature-high humidity conditions, copy images become thin. Ween such a photosensitive member is used in an electrophotographic printer of the reversal development type, the resultant images are liable to be accompanied with black spotty defects (black spots). Further, the above-mentioned photosensitive member of prior art having an intermediate layer comprising a cured layer of a polyurethane which is a reaction product between a polyether compound and a polyisocyanate compound, shows an effect of decreasing fog due to a lowering in electric resistance but is still accompanied with a problem that the resultant images are liable to be accompanied with black spotty defects (black spots).

SUMMARY OF THE INVENTION

Accordingly, an object of the present invention is to provide an electrophotographic photosensitive member capable of retaining a stable potential characteristic and thus stably forming images over wide environmental conditions ranging from low temperature-low humidity to high temperature-high humidity conditions.

Another object of the present invention is to provide an electrophotographic photosensitive member having an intermediate layer showing an excellent adhesion to the support and a good film characteristic and capable of forming good images free from defects under wide environmental conditions.

A further object of the present invention is to provide electrophotographic apparatus using such an improved photosensitive member.

According to the present invention, there is provided an electrophotographic photosensitive member, comprising: an electroconductive support, and an intermediate layer and a photosensitive layer disposed in this order on the support, wherein said intermediate layer comprises a reaction product of a polyol compound comprising at least one of a polyol compound [1] represented by Formula (1) shown below and a phosphated polyol compound with a polyisocyanate compound:

  Formula (1)

wherein A denotes

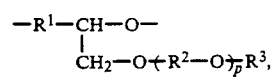

B denotes —R$^4$—O—, A and B may be connected at random or in blocks with each other, Z denotes an active hydrogen compound residue; R$^1$ is an alkylene group having 1-9 carbon atoms; R$^2$ is an alkylene group having 1-10 carbon atoms; R$^3$ is an alkyl group, alkenyl group, aryl group or aralkyl group having 1-20 carbon atoms; R$^4$ is an alkylene group having 2-10 carbon atoms; k is a number of 1-12; m is a number of 1-250; n is a number of 0-100; and p is a number of 0-5.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
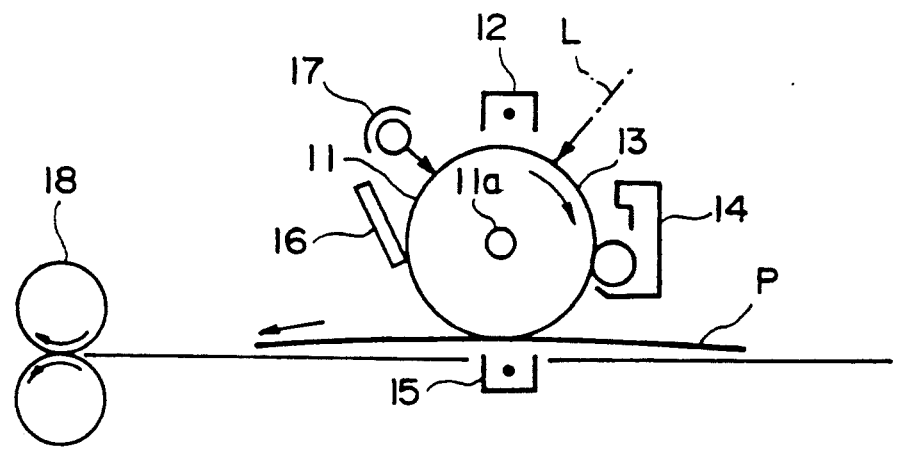
FIG. 1 is a schematic sectional view of a transfer-type copying machine loaded with an electrophotographic photosensitive member according to the present invention.

The photosensitive member according to the present invention is provided with a stable potential characteristic and a good image forming characteristic over wide environmental conditions ranging from low temperature-low humidity to high temperature-high humidity conditions because it has an intermediate layer comprising a reaction product of at least one polyol compound selected from the polyol compound [I] and the phosphated polyol compound [II] with a polyisocyanate compound. The improved effects may be attributable to non-crystallization of the product polymer due to the presence of the side chain-type polyether unit (A) in the case of the reaction product of the polyol compound [I] with a polyisocyanate compound, and an increase in ionic conductivity due to the introduction of a phosphate group in the case of the reaction product of the phosphated polyol compound [II] with a polyisocyanate compound. Further, when the using the reaction product of both the polyol compounds [I] and [II] with a polyisocyanate compound, the non-crystallization and increased ionic conductivity of the product are considered to contribute to the effects of the present invention in combination.

The polyol compound [I] having a basic structure represented by the formula (1) may for example be formed by reacting an active hydrogen(—containing) compound with a glycidyl ether in the presence of a catalyst.

The active hydrogen compound may be a compound having two or more active hydrogen atoms in its molecule, and examples thereof may include: polyhydric alcohols, such as ethylene glycol, propylene glycol, 1,4-butanediol, glycerine, trimethylolpropane, pentaerythritol, sorbitol, sucrose, and polyglycerine; amines, such as monoethanolamine, butylamine, 2-ethylhexylamine, ethylenediamine, hexamethylenediamine, diethylenetriamine, triethylenetetramine, tetraethylenepentamine, pentaethylenehexamine, aniline, benzylamine, and phenylenediamine; and polyhydric phenols, such as bisphenol A, bisphenol F, 1,1-bis(hydroxyphenyl)ethane, bisphenol AP, acetophenone, and hydroquinone.

Examples of the glycidyl ether reacted with the active hydrogen compound may include those having a substituent of an alkyl group, alkenyl group, aryl group or aralkyl group represented by the following formula (2):

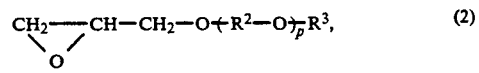

wherein $R^2$ is an alkylene group having 1-10 carbon atoms, such as methylene, ethylene, propylene, butylene, hexene, and nonene; $R^3$ is an alkyl group, alkenyl group, aryl group or aralkyl group having 1-20 carbon atoms, inclusive of alkyl groups, such as methyl, ethyl, isopropyl and butyl, alkenyl groups, such as vinyl and allyl, aryl groups, such as phenyl and naphthyl, and aralkyl groups, such as benzyl and phenethyl; and p is a number of 0-5.

At the time of the reaction of the active hydrogen compound with the glycidyl ether, it is possible to also react an alkylene oxide having 2-10 carbon atoms, examples of which may include: ethylene oxide, propylene oxide, butylene oxide, hexene oxide, cyclohexene oxide and nonene oxide.

In the case of reaction with the active hydrogen compound, the glycidyl ether and the alkylene oxide may be reacted in mixture or in any arbitrary order so as to provide a polyol compound [I] in the form of either a random polymer or a block polymer.

As the catalyst for the above reaction, basic catalysts, such as sodium methoxide, sodium hydroxide, potassium hydroxide, lithium carbonate and triethylamine, may generally be used, but a Lewis acid catalyst such as boron trifluoride can also be used.

Specific examples of the polyol compound [I] represented by the formula (1) used in the present invention are shown in the following Table 1.

TABLE 1

TABLE 1-continued

Polyol compound I
$$Z\text{-}[(\text{-}A\text{-})_{\overline{m}}(\text{-}B\text{-})_{\overline{n}}H]_k$$

| No. | Active hydrogen compound Z (residue) | A component $(\text{-}A\text{-})_{\overline{m}}$ | $\overline{m}^{1)}$ | B component $(\text{-}B\text{-})_{\overline{n}}$ | $\overline{n}^{2)}$ | k | $\overline{Mn}^{3)}$ |
|---|---|---|---|---|---|---|---|
| 4 | pentaerythritol | $-CH_2-CH-O-\ CH_3$<br>      \|         \|<br>    $CH_2-O(CH-CH_2-O)_3CH_3$ | 7.3 | $-CH_2-CH_2-O-$ | 2.2 | 4 | 8000 |
| 5 | ethylenediamine | $-CH_2-CH-O-$<br>      \|<br>    $CH_2-O-\text{Ph}$ | 9.5 | $CH_3$<br>   \|<br>$-CH-CH_2-O-$ | 1.0 | 4 | 6000 |
| 6 | glycerine | $-CH_2-CH-O-$<br>      \|<br>    $CH_2-O(CH_2-CH_2-O)_{\overline{2}}CH_3$ | 7.5 | $C_2H_5$<br>   \|<br>$-CH-CH_2-O-$ | 0.7 | 3 | 4200 |
| 7 | trimethylolpropane | $-CH_2-CH-O-$<br>      \|<br>    $CH_2-O(CH_2-CH_2-O)_{\overline{3}}C_4H_7$ | 3.4 | cyclohexyl-$O-$ | 1.5 | 3 | 3200 |
| 8 | propylene glycol | $-CH_2-CH-O-$<br>      \|<br>    $CH_2-O(CH_2-CH_2-O)_{\overline{2.7}}\text{Ph}$ | 1.1 | $C_7H_{15}$<br>   \|<br>$-CH-CH_2-O-$ | 0.7 | 2 | 900 |
| 9 | pentaerythritol | $-CH_2-CH-O-\ CH_3$<br>      \|         \|<br>    $CH_2-O(CH-CH_2-O)_{\overline{3}}CH_3$ | 6.1 | $C_2H_5$<br>   \|<br>$-CH-CH_2O-$ | 5.5 | 4 | 8000 |
| 10 | ethylenediamine | $-CH_2-CH-O-$<br>      \|<br>    $CH_2-O-\text{Ph}$ | 3.8 | $C_4H_9$<br>   \|<br>$-CH-CH_2-O-$ | 11.6 | 4 | 7000 |
| 11 | glycerine | $-CH_2-CH-O-$<br>      \|<br>    $CH_2-O(CH_2-CH_2-O)_{\overline{4.7}}CH_3$ | 10.7 | — | 0 | 3 | 10000 |
| 12 | glycerine | $-CH_2-CH-O-$<br>      \|<br>    $CH_2-O-CH_3$ | 24.3 | — | 0 | 3 | 6500 |
| 13 | trimethylolpropane | $-CH_2-CH-O-\ C_2H_5$<br>      \|         \|<br>    $CH_2-O(CH-CH_2-O)_{\overline{2.2}}CH_3$ | 7.2 | $-CH_2-CH_2-O-$ | 2.5 | 3 | 5500 |
| 14 | trimethylolpropane | $-CH_2-CH-O-$<br>      \|<br>    $CH_2-O(CH_2-CH_2-O)_{\overline{4.2}}C_2H_5$ | 1.5 | — | 0 | 3 | 1400 |
| 15 | pentaerythritol | $-CH_2-CH-O-$<br>      \|<br>    $CH_2-O(CH_2-CH_2-O)_{\overline{2}}CH_3$ | 7.8 | $-CH_2-CH_2-O-$ | 2.0 | 4 | 6000 |
| 16 | glycerine | $CH_3$<br>  \|<br>$-CH-CH-O-$<br>      \|<br>    $CH_2-O-CH_2-CH_2-O-CH_3$ | 3.4 | — | 0 | 3 | 1600 |
| 17 | propylene glycol | $C_7H_{15}$<br>  \|<br>$-CH-CH-O-$<br>      \|<br>    $CH_2-O(CH_2-CH_2-O)_{\overline{2}}C_2H_5$ | 14.6 | — | 0 | 2 | 8500 |
| 18 | propylene glycol | $-CH_2-CH-O-$<br>      \|<br>    $CH_2-O-C_2H_5$ | 93 | — | 0 | 2 | 19000 |

TABLE 1-continued

| | Active hydrogen compound Z | Polyol compound 1 $Z\text{-}[(A)_{\overline{m}}(B)_{\overline{n}}H]_k$ | | | | | |
|---|---|---|---|---|---|---|---|
| | | $(A)_{\overline{m}}$ | | $(B)_{\overline{n}}$ | | | |
| No. | (residue) | A component | $\overline{m}^{1)}$ | B component | $\overline{n}^{2)}$ | k | $\overline{Mn}^{3)}$ |
| 19 | propylene glycol | —CH$_2$—CH—O— CH$_3$<br>          |        |<br>      CH$_2$—O—CH—CH$_2$—O—CH$_3$ | 8.7 | —CH$_2$—CH$_2$—O— | 47 | 2 | 6500 |
| 20 | sucrose | —CH$_2$—CH—O—<br>         |<br>   CH$_2$—O$(\text{CH}_2\text{—CH}_2\text{—O})_{\overline{3}}$CH$_3$ | 2.9 | | 0 | 8 | 5500 |

Notes:
$^{1)}\overline{m}$: average of m.
$^{2)}\overline{n}$: average of n.
$^{3)}\overline{Mn}$: number-average molecular weight Next, some specific examples of synthesis of the polyol compound [I] are shown below.

SYNTHESIS EXAMPLE 1—1 (EXAMPLE COMPOUND NO. 1)

70 g of glycerin as a starting material and 12 g of catalyst potassium hydroxide were placed in an autoclave, and 4000 g of methyldiethylene glycol glycidyl ether of the following formula was gradually added thereto in 6 hours for reaction at 120° C.

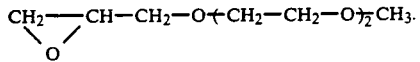

The reaction was completed by further 2 hours of reaction at the same temperature, and desalting and purification were performed to recover 3600 g of a polyol compound of Example Compound No. 1 having an Mn (number-average molecular weight calculated from the hydroxyl value) of 4000.

SYNTHESIS EXAMPLE 1-2 (EXAMPLE COMPOUND NO. 2)

134 g of trimethylolpropane as a starting material and 10 g of catalyst potassium hydroxide were placed in an autoclave, and 3100 g of n-butyltriethylene glycol glycidyl ether of the following formula was gradually added thereto in 6 hours for at 120° C.

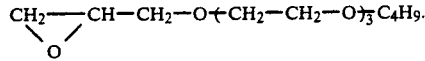

The reaction was completed by further 2 hours of reaction at the same temperature, and desalting and purification were performed to recover 2900 g of a polyol compound of Example Compound No. 2 having an Mn of 2900.

On the other hand, the phosphated polyol compound [II] may be prepared from a polyoxyalkylene polyol compound (or polyether polyol), which in turn may be prepared through a process wherein one or more species of alkylene oxides each having 2-10 carbon atoms are polymerized or copolymerized together with an active hydrogen compound in the presence of a catalyst, and the product is treated for removal of the catalyst by an ordinary purification method, such as ion exchange, neutralization filtration or adsorption. The polyoxyalkylene polyol may preferably have a number-average molecular weight of 200-10,000.

Examples of the active hydrogen compound, the alkylene oxides having 2-10 carbon atoms and the catalyst may respectively be the same as those described above used for preparation of the polyol compound [1].

The phosphated polyol Compound [II] may be obtained by reacting the polyoxyalkylene polyol compound with a phosphorus compound, preferably a phosphorus oxide, such as phosphorus pentoxide (P$_2$O$_5$) and phosphorus oxytrichloride (POCl$_3$) in a manner which per se is known. In this instance, the oxyalkylene polyol compound and the phosphorus compound may preferably be reacted in a ratio suitable for providing a phosphated polyol compound [II] having a hydroxyl value of ordinarily 10-2000 mgKOH/g.

Some specific examples of the phosphated polyol compound [II] are shown in the following Table 2.

TABLE 2

| | | Phosphated polyol compound [II] | | | | | | | |
|---|---|---|---|---|---|---|---|---|---|
| | | Polyoxyalkylene polyol | | | | | | | |
| | | Alkylene oxide Number of carbon atoms *1, *2 | | | Copolymer form | | | Phosphorus compound | | phosphated polyol | |
| | Active hydrogen compound | 2 | 3 | 4 | BK *3 | RM *4 | Mn | Species | Ratio *5 | Hydroxyl value (mg KOH/g) | Viscosity (cps/25° C.) |
| A | glycerine | 80 | 20 | | | o | 600 | P$_2$O$_5$ | 4 | 240 | 450 |
| B | glycerine | 50 | 50 | | o | | 200 | POCl$_3$ | 15 | 785 | 360 |
| C | ethylene glycol | 100 | 0 | | | | 300 | P$_2$O$_5$ | 12 | 324 | 200 |
| D | ethylene glycol | 60 | 40 | | | o | 400 | P$_2$O$_5$ | 9 | 253 | 310 |
| E | bisphenol A | 50 | 50 | | o | | 500 | P$_2$O$_5$ | 6 | 197 | 390 |
| F | trimethylol-propane | 90 | | 10 | | o | 800 | P$_2$O$_5$ | 3 | 118 | 520 |
| G | trimethylol-propane | 70 | | 30 | | o | 500 | P$_2$O$_5$ | 3 | 311 | 410 |
| H | penta-erythritol | 40 | | 60 | | o | 600 | POCl$_3$ | 9 | 303 | 400 |

TABLE 2-continued

| | | Phosphated polyol compound [II] | | | | | | | |
|---|---|---|---|---|---|---|---|---|---|
| | | Polyoxyalkylene polyol | | | | | | phosphated polyol | |
| | | Alkylene oxide Number of carbon atoms *1, *2 | | | Copolymer form | | | Phosphorus compound | |
| | Active hydrogen compound | 2 | 3 | 4 | BK *3 | RM *4 | Mn | Species | Ratio *5 | Hydroxyl value (mg KOH/g) | Viscosity (cps/25° C.) |
| I | sorbitol | 80 | 20 | | | ○ | 600 | POCl$_3$ | 4 | 512 | 390 |
| J | sorbitol | 50 | 50 | | ○ | | 1500 | P$_2$O$_5$ | 8 | 161 | 620 |
| K | propylene glycol | | 100 | | | | 4000 | POCl$_3$ | 8 | 19 | 710 |

Notes of Table 2
*1: Number of carbon atoms
  2: ethylene oxide
  3: propylene oxide
  4: butylene oxide
*2: Numerals denote weight % values of the added alkylene oxides
*3: block copolymer
*4: random copolymer
*5: Amount (wt. parts) of the phosphorus compound reacted per 100 wt. parts of the polyoxyalkylene polyol.

Some specific examples of synthesis of the phosphated polyol compound [II] are shown below.

SYNTHESIS EXAMPLE 2-1 (EXAMPLE COMPOUND A)

550 g of ethylene oxide and 2200 g of propylene oxide were reacted together with 460 g of glycerine as a starting material in the presence of 9 g of catalyst potassium hydroxide in a 5000 ml-autoclave at 120° C. for 6 hours, followed by desalting purification, to recover 2950 g of a polyoxyalkylene polyol having an Mn (number-average molecular weight calculated from the hydroxyl value) of 600.

4 g of phosphorus pentoxide was added to 100 g of the polyoxyalkylene polyol, and the mixture was reacted for 6 hours at 70° C. under stirring to obtain phosphated polyol compound A (hydroxyl value: 240 mgKOH/g, viscosity: 450 cps/25° C.).

SYNTHESIS EXAMPLE 2-2 (EXAMPLE COMPOUND K)

3100 g of propylene oxide was reacted together with 53 g of propylene glycol as a starting material in the presence of 8 g of catalyst potassium hydroxide in a 5000 ml-autoclave at 120° C. for 6 hours, followed by desalting purification, to recover 2800 g of a polyoxyalkylene polyol having an Mn of 4000.

8 g of phosphorus oxytrichloride was added to 100 g of the polyoxyalkylene polyol, and the mixture was reacted for 6 hours at 70° C. under stirring to obtain phosphated polyol compound K (hydroxyl value: 19 mgKOH/g, viscosity: 710 cps/25° C.).

In the present invention, the polyol compound [I] and the phosphated polyol compound [II] can be used in combination for reaction with a polyisocyanate compound.

In the present invention, it is also possible to use another polyol compound in addition to the polyol compounds [I] and/or [II] for reaction with a polyisocyanate compound. Such another polyol compound may suitably be, e.g., a polyoxyalkylene polyol or a glycidyl ether represented by the above-mentioned formula (2), and also a polyester polyol or an acrylate polyol. A polyoxyalkylene polyol having a number-average molecular weight of 200–10,000 is particularly suitable.

The above-mentioned polyol compound (polyol compound [I] and/or [II] and optional another polyol compound) is reacted with a polyisocyanate compound to provide a reaction product constituting the intermediate layer of the photosensitive member according to the present invention.

Examples of the polyisocyanate compound to be used in the present invention may include: 2,4-toluene diisocyanate (2,4-TDI), 2-6-toluene diisocyanate (2,6-TDI), 4,4'-diphenylmethane diisocyanate (MDI), hexamethylene diisocyanate (HMDI), isophorone diisocyanate, and mixtures and adducts thereof.

The polyisocyanate compound can also be used in a blocked isocyanate form (terminal-protected isocyanate). The blocking agent may for example be methyl ethyl ketoxime (MEKO), phenol, caprolactam, ethyl acetoacetate, methanol or sodium hydrogensulfite.

The blocking may be effected by adding such a blocking agent to the polyisocyanate compound and performing the reaction at 30°–90° C. for 0.5–2 hours.

The intermediate layer comprising a reaction product of the polyol compounds and polyisocyanate compound may be formed by applying a mixture including the above-mentioned polyol compound and polyisocyanate compound and then subjecting the resultant layer to curing under heating, or by synthesizing a polymer of the above-mentioned polyol compound and polyisocyanate compound in advance and then applying a solution of the polymer in an appropriate solvent, followed by drying.

It is also possible to form an intermediate product, such as a polyisocyanate compound prepared by reacting the above-mentioned polyol compound ([I]. II], etc.) with an excessive amount of an isocyanate compound, a blocked polyisocyanate compound prepared by protecting the terminals of such a polyisocyanate compound with a blocking agent, or an adduct prepared by adding a polyol compound such as a polyoxyalkylene polyol to such a polyisocyanate compound, formulate a paint containing such an intermediate product together with or in the absence of an additional polyol compound, and apply the paint, followed by curing under heating, to form the intermediate layer.

For the reaction between the polyol compound ([I], [II], etc.) and the polyisocyanate compound, it is possible to use a catalyst for accelerated reaction. The catalyst used for this purpose may for example include: amine catalysts, such as triethylamine, N,N-dimethylethanolamine, triethylenediamine N,N'-dimethylpiperazine and N-methylmorpholine: and metal salt catalysts, such as zinc octylate, tin octylate, dibutyltin dilaurate and dibutyltin diacetate.

The polyol compound ([I], [II], etc.) and the polyisocyanate compound may preferably be reacted in a functional group molar ratio (NCO group/OH group) of 1/1-2/1 between the NCO and OH groups.

The intermediate layer of the photosensitive member according to the present invention may be composed of a single layer comprising a reaction product between the above-mentioned polyol compound and polyisocyanate compound, but can also assume a laminated structure including plural layers, at least one of which comprises the above-mentioned reaction product. In case where the intermediate layer is composed of plural layers, another layer not comprising the above-mentioned reaction product may comprise a resin material, such as polyamide, polyester or phenolic resin.

The intermediate layer used in the present invention can further contain, e.g., another resin, additive or electroconductive substance, according to necessity.

Examples of such an electroconductive substance may include: powder or short fiber of metals such as aluminum, copper, nickel, and silver; electroconductive metal oxides, such as antimony oxides, indium oxide and tin oxide; carbon film, carbon black and graphite powder; and electroconductive obtained by coating with such an electroconductive substance.

The thickness of the intermediate layer according to the present invention may be determined in view of electrophotographic characteristics and influence of defects on the support and may generally be set within the range of 0.1-50 microns, more suitably 0.5-30 microns.

The intermediate layer may be formed by an appropriate coating method, such as dip coating, spray coating or roller coating.

In the present invention, the photosensitive layer may be either of a single layer-type or of a laminated layer-type functionally separated into a charge generation layer and a charge transport layer.

An organic charge generation layer of the laminated layer-type photosensitive layer may for example be prepared by dispersing an organic charge-generating substance, such as azo pigment, quinone pigment, quinocyanine pigment, perylene pigment, indigo pigment, azulenium salt pigment or phthalocyanine pigment into a solution containing a resin such as polyvinyl butyral, polystyrene, polyvinyl acetate, acrylic resin, polyvinylpyrrolidone, ethyl cellulose acetate butyrate to form a coating liquid, and applying the coating liquid onto the above-mentioned intermediate layer. The charge generation layer may have a thickness of at most 5 microns, preferably 0.05-2 microns.

A charge transport layer may be formed on such a charge generation layer by dissolving a charge transporting substance of, e.g., a polycyclic aromatic compound having a structure of biphenylene, anthracene, pyrene, phenanthrene, etc., in its main chain or side chain, a nitrogen-containing cyclic compound such as indole, carbazole, oxadiazole or pyrazoline, triarylamine compound, hydrazone compound, or styryl compound into a solution of a film-forming resin to form a coating liquid, and applying the coating liquid. The film-forming resin may for example include polyester, polycarbonate, polymethacrylate and polystyrene.

The charge transport layer may ordinarily have a thickness of 5-40 microns, preferably 10-30 microns.

The laminated layer-type photosensitive layer can also assume a structure wherein the charge generation layer is disposed on the charge transport layer.

A single layer-type photosensitive layer may be formed as a layer containing both the charge generating substance and the charge transporting substance together in a resin.

In the present invention, it is also possible to constitute the photosensitive layer as a layer of an organic photoconductive polymer, such as poylvinylcarbazole or polyvinylanthracene, a vapor-deposition layer of a charge generation substance as described above, a vapor-deposited selenium layer, a vapor-deposited selenium-tellurium layer, or an amorphous silicon layer.

On the other hand, the support used in the present invention may be any one as far as it has an electroconductivity, inclusive of, e.g., a metal, such as aluminum, copper, chromium, nickel, zinc or stainless steel formed into a cylinder or sheet; a plastic film or paper laminated with a foil of a metal such as aluminum or copper, a plastic film provided thereon with a vapor-deposited layer of, e.g., aluminum, indium oxide or tin oxide, or a plastic film or paper coated with an electroconductive layer of an electroconductive substance alone or dispersed in an appropriate binder resin.

The electrophotographic photosensitive member according to the present invention may be applicable to an electrophotographic apparatus in general, inclusive of a copying machine, a laser printer, an LED printer and a liquid crystal shutter-type printer. and further widely applicable to apparatus, such as a display, a recording apparatus, a mini-scale printing apparatus, a plate production apparatus and a facsimile apparatus, utilizing electrophotography in an applied form.

FIG. 1 shows a schematic structural view of an ordinary transfer-type electrophotographic apparatus using an electrophotosensitive member of the invention. Referring to FIG. 1, a photosensitive drum (i.e., photosensitive member) 11 as an image-carrying member is rotated about an axis 11a at a prescribed peripheral speed in the direction of the arrow shown inside of the photosensitive drum 11. The surface of the photosensitive drum is uniformly charged by means of a charger 12 to have a prescribed positive or negative potential. The photosensitive drum 11 is exposed to light-image L (as by slit exposure or laser beam-scanning exposure) by using an image exposure means (not shown), whereby an electrostatic latent image corresponding to an exposure image is successively formed on the surface of the photosensitive drum 11. The electrostatic latent image is developed by a developing means 14 to form a toner image. The toner image is successively transferred to a transfer material P which is supplied from a supply part (not shown) to a position between the photosensitive drum 11 and a transfer charger 15 in synchronism with the rotating speed of the photosensitive drum 11, by means of the transfer charger 15. The transfer material P with the toner image thereon is separated from the photosensitive drum 11 to be conveyed to a fixing device 18, followed by image fixing to print out the transfer material P as a copy outside the electrophotographic apparatus. Residual toner particles on the surface of the photosensitive drum 11 after the transfer are removed by means of a cleaner 16 to provide a cleaned surface, and residual charge on the surface of the photosensitive drum 11 is erased by a pre-exposure means 17 to prepare for the next cycle. As the charger 12 for charging the photosensitive drum 11 uniformly, a corona charger is widely used in general. As the transfer charger 15, such a corona charger is also widely used in general.

According to the present invention, in the electrophotographic apparatus, it is possible to provide an apparatus unit which includes plural means inclusive of or selected from the photosensitive member (photosensitive drum), the charger, the developing means, the cleaner, etc. so as to be attached to or released from the apparatus body, as desired. The device unit may, for example, be composed of the photosensitive member and the cleaner to prepare a single unit capable of being attached to or released from the body of the electrophotographic apparatus by using a guiding means such as a rail in the body. The apparatus unit can be further accompanied with the charger and/or the developing means to prepare a single unit.

In case where the electrophotographic apparatus is used as a copying machine or a printer, exposure light-image L may be given by reading data on reflection light or transmitted light from an original or, converting the data on the original into a signal and then effecting a laser beam scanning, a drive of LED array or a drive of a liquid crystal shutter array.

Figure 2:
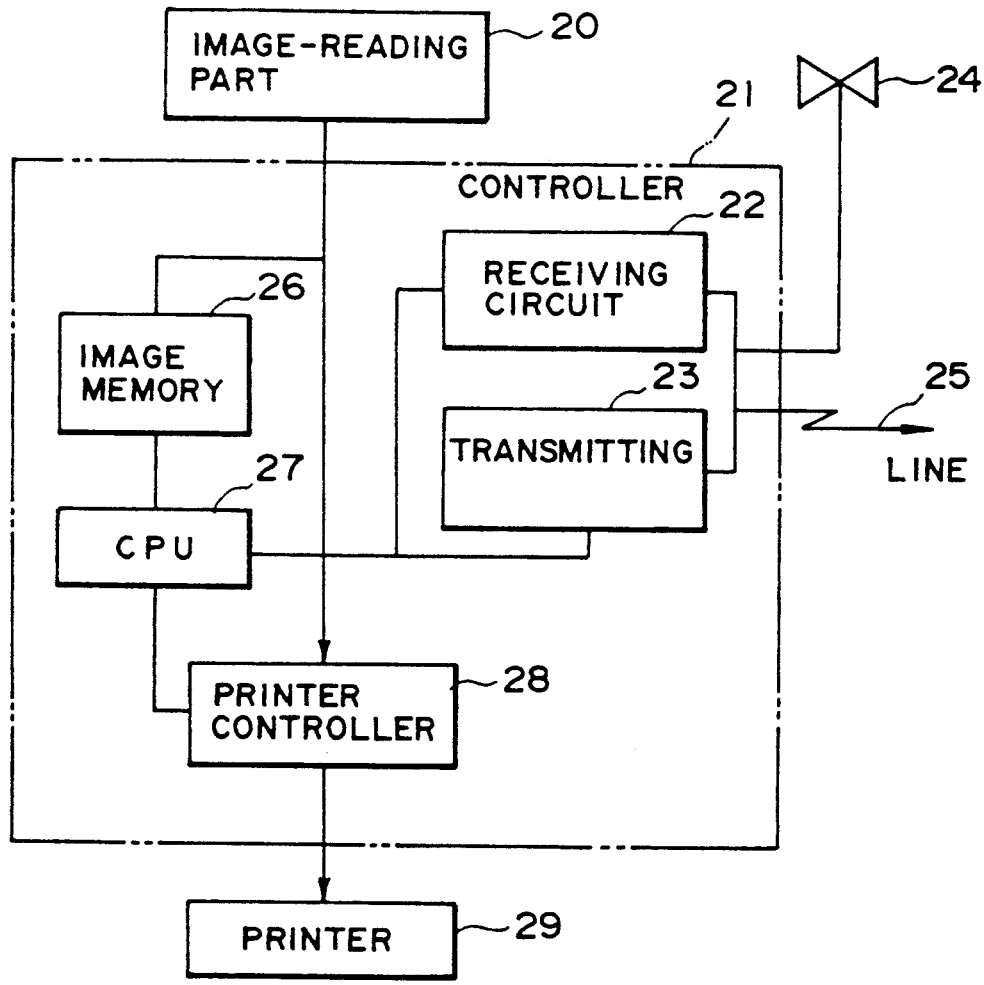
FIG. 2 is a block diagram of a facsimile system using a printer incorporating an electrophotographic photosensitive member according to the present invention.

In case where the electrophotographic apparatus according to the present invention is used as a printer of a facsimile machine, exposure light-image L is given by exposure for printing received data. FIG. 2 shows a block diagram of an embodiment for explaining this case. Referring to FIG. 2, a controller 21 controls an image-reading 20 and a printer 29. The whole controller 21 is controlled by a CPU (central processing unit) 27. Read data from the image-reading part is transmitted to a partner station through a transmitting circuit 23, and on the other hand, the received data from the partner station is sent to the printer 29 through a receiving circuit 22. An image memory memorizes prescribed image data. A printer controller 28 controls the printer 29, and reference number 24 denotes a telephone handset.

The image received through a line 25 (the image data sent through the circuit from a connected remote terminal) is demodulated by means of the receiving circuit 22 and successively stored in an image memory 26 after a restoring-signal processing of the image data. When image for at least one page is stored in the image memory 26, image recording of the page is effected. The CPU 27 reads out the image data for one page from the image memory 26 and sends the image data for one page subjected to the restoring-signal processing to the printer controller 28. The printer controller 28 receives the image data for one page from the CPU 27 and controls the printer 29 in order to effect image-data recording. Further, the CPU 27 is caused to receive image for a subsequent page during the recording by the printer 29. As described above, the receiving and recording of the image are performed.

Hereinbelow, the present invention will be explained based on Examples wherein "part(s)" means "part(s) by weight".

EXAMPLE 1-1

A paint for an intermediate layer having the following composition was prepared by mixing.

| | |
|---|---|
| Polyol compound No. 1 | 9.6 wt. part(s) |
| Hexamethylene diisocyanate (HMDI) | 1.4 wt. part(s) |
| Dibutyltin dilaurate (DBTL) | 0.02 wt. part(s) |
| Methyl ethyl ketone (MEK) | 80 wt. part(s) |

The paint was applied onto an aluminum cylinder (OD (outer diameter)=30 mm, L (length)=360 mm) by dipping and then dried and cured at 150° C. for 30 min. to form a 3.0 micron-thick intermediate layer.

Separately, 4 parts of a disazo pigment represented by the following formula:

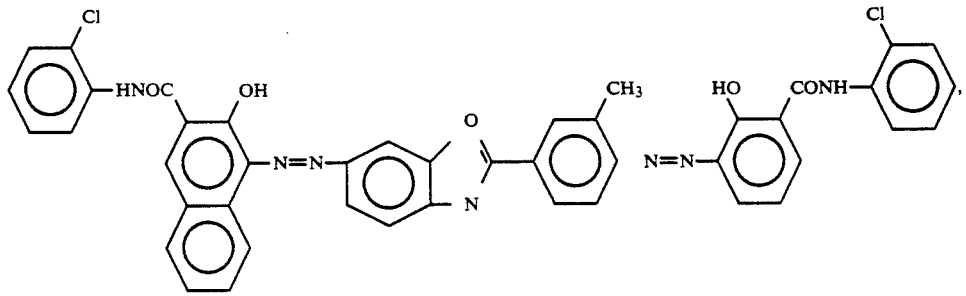

2 parts ofof a butyral resin (butyral degree=68%, Mw (weight-average molecular weight)=24000) and 34 parts of cyclohexanone were dispersed for 8 hours by means of a sand mill containing 1 mm-dia. glass beads and diluted with 60 parts of tetrahydrofuran (THF) to prepare a coating liquid for a charge generation layer. The thus prepared coating liquid was applied by dipping onto the above prepared intermediate layer and dried at 80° C. for 15 min. form a 0.2 micron-thick charge generation layer.

Then, 10 parts of a hydrazone compound of the formula:

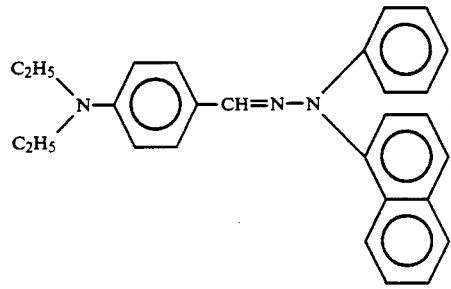

10 parts of a bisphenol Z-type polycarbonate (Mw=30000), 10 parts of dichloromethane and 50 parts of monochlorobenzene were dissolved in mixture to form a coating liquid for a charge transport layer. The coating liquid was applied onto the above-formed charge generation layer by dipping and dried for 60 min. at 110° C. to form a 20 micron-thick charge transport layer.

The thus-prepared electrophotographic photosensitive member was incorporated in a copying apparatus, and the electrophotographic performances thereof were evaluated by a process wherein steps of charging-exposure-development-transfer-cleaning were repeated at a cycle of 0.8 sec under low temperature-low humidity conditions (15° C.-15% RH). The results are summarized in Table 3 appearing hereinafter.

As is shown in Table 3, the photosensitive member showed a large difference between the dark-part potential ($V_D$) and light-part potential ($V_L$), thus providing a sufficient contrast. Further, as a result of 1000 sheets of successive image formation, images could be formed in a very stable state without causing an increase in light-part potential ($V_L$).

EXAMPLES 1-2-1-4

Electrophotographic photosensitive members were prepared in the same manner as in Example 1-1 except that the following compositions were respectively used for preparing the intermediate layers.

| [Example 1-2] | |
| --- | --- |
| Polyol compound No. 2) | 18.1 part(s) |
| 2,4-TDI | 1.9 part(s) |
| DBTL | 0.02 part(s) |
| MEK | 80 part(s) |

| [Example 1-3] | |
| --- | --- |
| Polyol compound No. 5 | 17.6 part(s) |
| HMDI in a blocked from with methyl ethyl ketoxime (MEKO) | 2.4 part(s) |
| DBTL | 0.02 part(s) |
| MEK | 80 part(s) |

| [Example 1-4] | |
| --- | --- |
| Polyol compound No. 7 | 8.7 part(s) |
| Poly(oxyethylene)triol (Mn = 3000) | 8.7 part(s) |
| MDI | 2.6 part(s) |
| DBTL | 0.02 part(s) |
| MEK | 80 part(s) |

The above-prepared photosensitive members were evaluated in the same manner as in Example 1-1. As a result, the respective photosensitive members showed a large difference between dark-part potential ($V_D$) and light-part potential ($V_L$), thus providing a sufficient potential contrast. Further, as a result of 1000 sheets of successive image formation, the respective photosensitive members provided images in a very stable state while causing almost no increase in light-part potential ($V_L$).

The results are also summarized in Table 3.

EXAMPLE 1-5

| Example 1-5 | |
| --- | --- |
| Polyol compound No. 8 | 41.6 parts |
| 2,6-TDI | 8.4 parts |

The above ingredients were reacted under stirring for 4 hours at 90° C. to form a reaction product (polymer).

| | |
| --- | --- |
| The above reaction product | 10 parts |
| MEK | 60 parts |
| Dichloromethane | 30 parts |

A coating liquid was prepared by mixing the above ingredients, and an electrophotographic photosensitive member was prepared in the same manner as in Example 1-1 except that the coating liquid was used for preparing the intermediate layer.

The thus-prepared photosensitive member was evaluated in the same manner as in Example 1-1. As a result, the photosensitive member showed a large difference between dark-part potential ($V_D$) and light-part potential ($V_L$), thus providing a sufficient potential contrast. Further, as a result of 1000 sheets of successive image formation, the photosensitive member provided images in a very stable state while causing almost no increase in light-part potential ($V_L$).

The results are also shown in Table 3.

COMPARATIVE EXAMPLES 1-1 and 1-2

Electrophotographic photosensitive members were prepared in the same manner as in Example 1-1 except that the following compositions were respectively used for preparing the intermediate layers.

| [Comparative Example 1-1] | |
| --- | --- |
| Alcohol-soluble copolymer nylon ("Amilan CM-8000", mfd. by Toray K.K.) | 5 part(s) |
| Methanol | 95 part(s) |

| [Comparative Example 1-2] | |
| --- | --- |
| Polyester polyol ("Nippolan 125", mfd. by Nihon Polyurethane Kogyo K.K.) | 14 part(s) |
| 2,6-TDI | 6 part(s) |
| DBTL | 0.02 part(s) |
| MEK | 80 part(s) |

The photosensitive members were evaluated in the same manner as in Example 1-1 . As a result, both photosensitive members showed an increase in light-potential part potential ($V_L$), thus resulting in images accompanied with fog after 1000 sheets of successive copying.

The results are also summarized in Table 3 below.

Separately, the intermediate layers were formed according to the above-described methods of Examples 1-1-1-5 and Comparative Examples 1-1 and 1-2, and the adhesion strengths thereof were evaluated by a square matrix pattern (or checker pattern) peeling test according to JIS K5400 (general test method for paints).

As a result, the intermediate layers according to Examples 1-1-1-5 were all free from peeling, thus showing good adhesion to the aluminum substrate. On the other hand, the intermediate layers of Comparative Examples 1-1 and 1-2 showed peeling rates of 25% and 29% , respectively.

TABLE 3

|  | Initial Stage | | After 1000 sheets of sucessive copying | |
|---|---|---|---|---|
|  | Dark-part potential $V_D(-V)$ | Light-part potential $V_L(-V)$ | Light-part potential $V_L(-V)$ | Image evaluation |
| Example | | | | |
| 1-1 | 685 | 170 | 190 | Good |
| 1-2 | 660 | 175 | 190 | Good |
| 1-3 | 680 | 180 | 200 | Good |
| 1-4 | 670 | 165 | 180 | Good |
| 1-5 | 675 | 185 | 195 | Good |
| Comparative Example | | | | |
| 1-1 | 665 | 190 | 325 | Fog occurred |
| 1-2 | 670 | 200 | 360 | Fog occurred |

EXAMPLE 1-6

| Resol-type phenolic resin | 25 parts |
|---|---|
| Electroconductive titanium oxide powder (coated with tin oxide containing 10% of antimony oxide) | 50 parts |
| Methyl cellosolve | 20 parts |
| Methanol | 5 parts |

The above-ingredients were subjected to 2 hours of mixing and dispersion in a sand mill containing 1 mm-dia. glass beads to prepare a paint for a first intermediate layer.

The paint was applied onto an aluminum cylinder (OD=30 mm, L=260 mm) by dipping and then dried and cured at 140° C. for 30 min. to form a 20 micron-thick first intermediate layer.

| Polyol compound No. 14 | 14.0 part(s) |
|---|---|
| 2,4-TDI in a blocked form with MEKO | 6.0 part(s) |
| DBTL | 0.02 part(s) |
| MEK | 80 part(s) |

The above ingredients were dissolved in mixture to form a paint for a second intermediate layer, which was then applied by dipping onto the first intermediate layer and dried and cured at 150° C. for 20 min. to form a 0.6 micron-thick second intermediate layer.

Then, 3 parts of a disazo pigment of the formula:

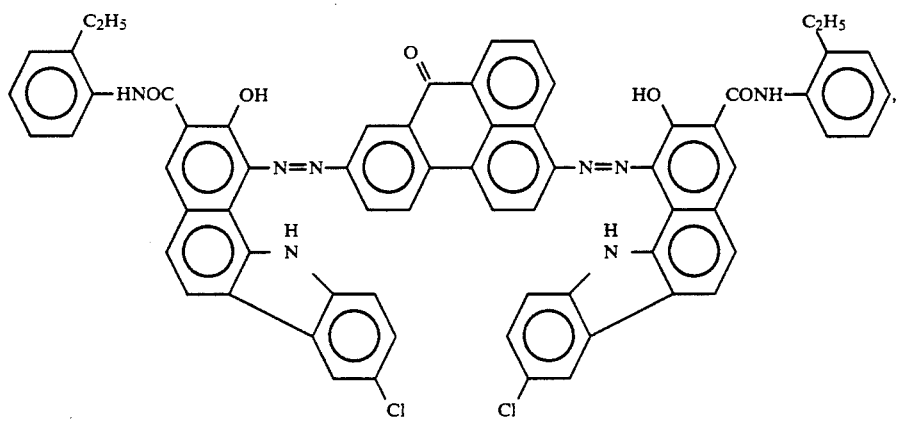

2 parts of polyvinyl benzal (benzal degree=80%, Mw=1000) and 35 parts of cyclohexanone were subjected to 12 hours of mixing and dispersion by a sand mill containing 1 mm-dia. glass beads and further dispersed after adding 60 parts of methyl ethyl ketone (MEK) to form a coating liquid for a charge generation layer. The coating liquid was applied by dipping onto the above second intermediate layer and dried at 80° C. for 20 min. to form a 0.2 micron-thick charge generation layer.

Then, 10 parts of a styryl compound of the formula:

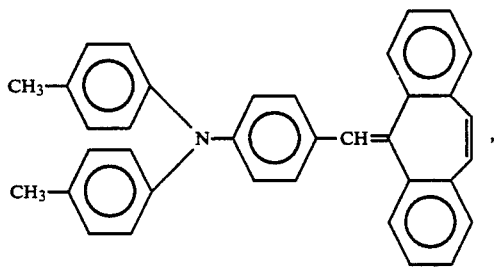

10 parts of a bisphenol Z-type polycarbonate (Mw=30000), 15 parts of dichloromethane and 45 parts of monochlorobenzene were dissolved in mixture to form a coating liquid for a charge transport layer. The coating liquid was applied onto the above-formed charge generation layer by dipping and dried for 60 min. at 120° C. to form a 18 micron-thick charge transport layer.

The thus-prepared electrophotographic photosensitive member was incorporated in a laser printer of the reversal development type, and the electrophotographic performances thereof were evaluated by a process wherein steps of charging-exposure-development-transfer-cleaning were repeated at a cycle of 1.5 sec under normal temperature-normal humidity conditions (23° C.-50% RH) and high temperature-high humidity conditions (30° C.-85% RH). The results are summarized in Table 4 appearing hereinafter.

As is shown in Table 4, the photosensitive member showed a large difference between the dark-part potential ($V_D$) and light-part potential ($V_L$), thus providing a sufficient contrast. Further, also under the high temperature-high humidity conditions, the dark-part potential was stable and good images free from black spots or fog could be formed.

EXAMPLES 1-7–1-10

Electrophotographic photosensitive members were prepared in the same manner as in Example 1-6 except that the following compositions were respectively used for preparing the second intermediate layers.

[Example 1-7]

| | |
|---|---|
| Polyol compound [I] No. 3 | 12.8 part(s) |
| HMDI in a phenol-blocked form | 7.2 part(s) |
| DBTL | 0.02 part(s) |
| MEK | 80 part(s) |

[Example 1-8]

| | |
|---|---|
| Polyol compound No. 9 | 17.8 part(s) |
| MDI in an MEKO-blocked form | 2.2 part(s) |
| DBTL | 0.02 part(s) |
| MEK | 80 part(s) |

[Example 1-9]

| | |
|---|---|
| Polyol compound No. 1 | 10.3 part(s) |
| Polyol compound No. 2 | 6.8 part(s) |
| 2,6-TDI in an MEKO-blocked form | 2.9 part(s) |
| DBTL | 0.04 part(s) |
| MEK | 80 part(s) |

[Example 1-10]

| | |
|---|---|
| Polyol compound No. 11 | 19.4 part(s) |
| HMDI in a trimerized form isocyanurate | 0.6 part(s) |
| Tin octylate | 0.02 part(s) |
| MEK | 80 part(s) |

The above-prepared photosensitive members were evaluated in the same manner as in Example 1-6. As a result, each photosensitive member maintained a stable dark-part potential ($V_D$) even under high temperature-high humidity conditions and could provide good images free from occurrence of black spots or fog.

The results are summarized in Table 4.

COMPARATIVE EXAMPLES 1-3–1-5

Electrophotographic photosensitive members were prepared in the same manner as in Example 6 except that the following compositions were respectively used for preparing the second intermediate layers.

[Comparative Example 1-3]

| | |
|---|---|
| N-methoxymethylated 6-nylon (Mw = 50000, methoxymethyl-substitution rate = 28%) | 5 part(s) |
| Methanol | 95 part(s) |

[Comparative Example 1-4]

| | |
|---|---|
| Poly(oxypropylene)triol (hydroxyl value = 170 mg KOH/g) | 15 part(s) |
| 2,4-TDI | 5 part(s) |
| DBTL | 0.02 part(s) |
| MEK | 80 part(s) |

[Comparative Example 1-5]

| | |
|---|---|
| Poly(oxyethylene)glycol (hydroxyl value = 37.5 mg KOH/g) | 17.6 part(s) |
| 2,6-TDI in an MEKO-blocked form | 2.4 part(s) |
| DBTL | 0.02 part(s) |
| MEK | 80 part(s) |

The photosensitive members were evaluated in the same manner as in Example 1-6. As a result, the photosensitive member according to Comparative Example 1-3 showed a decrease in chargeability to lower the dark-part potential ($V_D$) under the high temperature-high humidity conditions and also provided images accompanied with black spots and fog. On the other hand, the photosensitive members according to Comparative Examples 1-4 and 1-5 did not show a decrease in chargeability under the high temperature-high humidity conditions, but the resultant images were accompanied with black spots.

The results are summarized in Table 4.

Separately, the intermediate layers were formed according to the above-described methods of Examples 1-6–1-10 and Comparative Examples 1-3 and 1-5, and the adhesion strengths thereof were evaluated by a square matrix pattern (or checker pattern) peeling test according to JIS K5400.

As a result, the intermediate layers according to Examples 1-6–1-10 were all free from peeling, thus showing good adhesion to the aluminum substrate. On the other hand, the intermediate layers of Comparative Examples 1-3 to 1-5 showed peeling rates of 22%, 35% and 31%, respectively.

TABLE 4

| | Environmental conditions | | | |
|---|---|---|---|---|
| | 23° C., 50% RH | | 30° C., 85% RH | |
| | $V_D(-V)$ | $V_L(-V)$ | $V_D(-V)$ | Image |
| Example | | | | |
| 1-6 | 620 | 150 | 610 | Good |
| 1-7 | 625 | 170 | 605 | Good |
| 1-8 | 615 | 155 | 610 | Good |
| 1-9 | 640 | 160 | 620 | Good |
| 1-10 | 630 | 165 | 625 | Good |
| Comparative Example | | | | |
| 1-3 | 635 | 165 | 560 | Black spots and fog occurred |
| 1-4 | 630 | 165 | 610 | Black spots occurred |
| 1-5 | 630 | 180 | 615 | Black spots occurred |

EXAMPLE 1-11

| | |
|---|---|
| Polyol compound No. 4 | 18.2 part(s) |
| 2,6-TDI in MEKO-blocked form | 1.8 part(s) |
| Electroconductive titanium oxide powder (coated with tin oxide containing 8% of antimony oxide) | 20 part(s) |
| Rutile-type titanium oxide powder | 20 part(s) |
| DBTL | 0.02 part(s) |
| MEK | 40 part(s) |

The above-ingredients were subjected to 3 hours of mixing and dispersion in a sand mill containing 1 mm-dia. glass beads to prepare a paint for a first intermediate layer.

The paint was applied onto an aluminum cylinder (OD=60 mm, L=260 mm) by dipping and then dried and cured at 150° C. for 30 min. to form a 15 micron-thick first intermediate layer.

Then, the paint for the second intermediate layer prepared in Example 1-6 was applied by dipping onto the above first intermediate layer, and dried and cured at 150° C. for 20 min. to form a 0.6 micron-thick second intermediate layer.

Then, 4 parts of a disazo pigment of the formula:

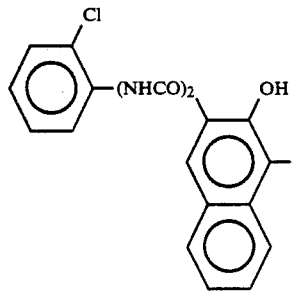 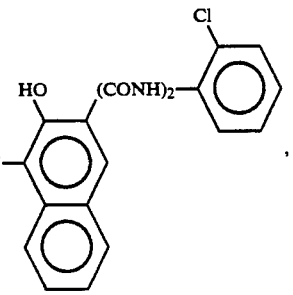

2 parts of polyvinyl butyral (butyral degree=71%, Mw=18000) and 34 parts of cyclohexanone were subjected to 6 hours of mixing and dispersion by a sand mill containing 1 mm-dia. glass beads and further dispersed after adding 60 parts of methyl ethyl ketone (MEK) to form a coating liquid for a charge generation layer. The coating liquid was applied by dipping onto the above second intermediate layer and dried at 80° C. for 15 min to form a 0.3 micron-thick charge generation layer.

Then, the coating liquid for a charge transport layer used in Example 1-6 was applied by dipping onto the charge generation layer and dried at 120° C. for 60 min to form a 22 micron-thick charge transport layer.

The thus-prepared electrophotographic photosensitive member was incorporated in a copying apparatus, and the electrophotographic performances thereof were evaluated by a process wherein steps of charging-exposure-development-transfer-cleaning were repeated at a cycle of 0.6 sec under low temperature-low humidity conditions (10° C.–10% RH). The results are summarized in Table 5 appearing hereinafter.

As is shown in Table 5, the photosensitive member showed a large difference between the dark-part potential ($V_D$) and light-part potential ($V_L$), thus providing a sufficient contrast. Further, as a result of 1000 sheets of successive image formation, images could be formed in a very stable state without causing an increase in light-part potential ($V_L$).

EXAMPLE 1-12

| Alcohol-soluble copolymer nylon ("Amilan CM-8000", mfd. by Toray K.K.) | 3 parts |
|---|---|
| N-methoxymethylated 6-nylon (Mw = 150000, methoxymethyl substitution rate = 30%) | 3 parts |
| Methanol | 94 parts |

An electrophotographic photosensitive member was prepared in the same manner as in Example 1-11 except that a coating liquid prepared from the above ingredients was used for forming the second intermediate layer.

EXAMPLE 1-13

An electrophotographic photosensitive member was prepared in the same manner as in Example 1-11 except that the second insulating layer was omitted to form on the support a laminated structure composed of the first intermediate layer, the charge generation layer and the charge transport layer.

The above-prepared photosensitive members of Examples 1-12 and 1-13 were evaluated in the same manner as in Example 1-11. As a result, each photosensitive member showed a large difference between the dark-part potential ($V_D$) and light-part potential ($V_L$), thus providing a sufficient potential contrast. Further, as a result of 1000 sheets of successive image formation, the photosensitive members provided images in a very stable state while causing almost no increase in light-part potential ($V_L$).

The results are summarized in Table 5.

COMPARATIVE EXAMPLES 1-6 AND 1-7

| Resol-type phenolic resin | 20 parts |
|---|---|
| Electroconductive titanium oxide powder (coated with tin oxide containing 8% of antimony oxide) | 20 parts |
| Rutile-type titanium oxide powder | 20 parts |
| Methyl cellosolve | 25 parts |
| Methanol | 15 parts |

A paint for the first intermediate layer was prepared from the above ingredients otherwise in the same manner as in Example 1-11.

Electrophotographic photosensitive members of Comparative Examples 1-6 and 1-7 were prepared in the same manner as in Examples 1-12 and 1-13, respectively, except that the above-prepared paint was used for forming the first intermediate layer.

The photosensitive members were evaluated in the same manner as in Example 1-11. As a result, the photosensitive member of Comparative Example 1-6 caused an increase in light-part potential ($V_L$) after 1000 sheets of successive image formation, thus providing images accompanied with fog.

On the other hand, the photosensitive member of Comparative Example 1-7 having the charge generation layer and Charge transport layer directly formed on the first intermediate layer showed only a low dark-part potential ($V_D$) due to insufficient barrier characteristic causing a large charge injection from the support side. As a result, it failed to provide a potential contrast necessary for image formation.

The results are summarized in Table 5.

TABLE 5

| | Resin components for intermediate layers | | Initial stage | | After 1000 sheets | |
|---|---|---|---|---|---|---|
| | 1st | 2nd | $V_D(-V)$ | $V_L(-V)$ | $V_L(-V)$ | Image |
| Ex. | | | | | | |
| 1-11 | Polyether urethane | Polyether urethane | 725 | 165 | 197 | Good |
| 1-12 | Polyether urethane | nylon | 730 | 175 | 185 | Good |
| 1-13 | Polyether urethane | none | 715 | 155 | 165 | Good |
| Comp. Ex. | | | | | | |
| 1-6 | phenolic resin | nylon | 705 | 155 | 295 | Fog occurred |
| 1-7 | phenolic resin | none | 385 | 180 | (evaluation impossible) | |

EXAMPLE 2-1

A paint for an intermediate layer having the following composition was prepared by mixing.

| | |
|---|---|
| Phosphated polyol compound A | 14.3 wt. part(s) |
| Hexamethylene diisocyanate (HMDI) | 5.7 wt. part(s) |
| Dibutyltin dilaurate (DBTL) | 0.02 wt. part(s) |
| Methyl ethyl ketone (MEK) | 80 wt. part(s) |

The paint was applied onto an aluminum cylinder (OD (outer diameter)=30 mm, L (length)=360 mm) by dipping and then dried and cured at 150° C. for 30 min. to form a 3.0 micron-thick intermediate layer.

Separately, 4 parts of a disazo pigment represented by the following formula:

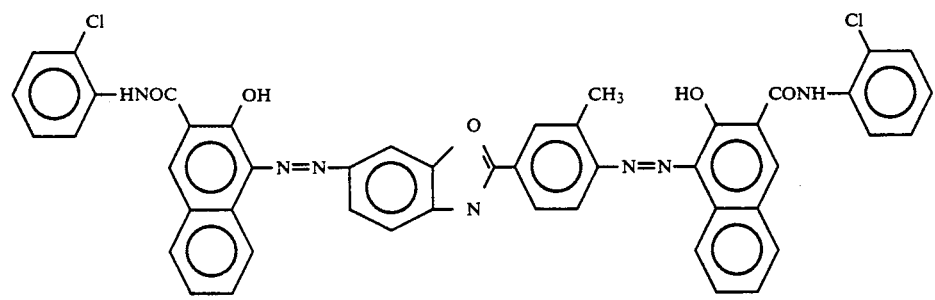

2 parts of of a butyral resin (butyral degree=68%, Mw (weight-average molecular weight)=24000) and 34 parts of cyclohexanone were dispersed for 8 hours by means of a sand mill containing 1 mm-dia. glass beads and diluted with 60 parts of tetrahydrofuran (THF) to prepare a coating liquid for a charge generation layer. The thus prepared coating liquid was applied by dipping onto the above prepared intermediate layer and dried at 80° C. for 15 min. form a 0.2 micron-thick charge generation layer.

Then, 10 parts of a hydrazone compound of the formula:

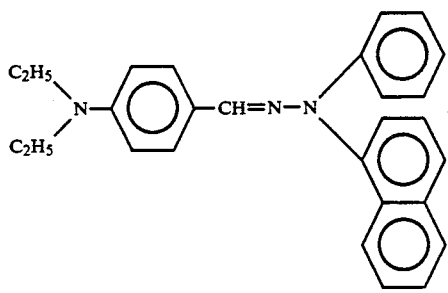

10 parts of a bisphenol Z-type polycarbonate (Mw=30000), 10 parts of dichloromethane and 50 parts of monochlorobenzene were dissolved in mixture to form a coating liquid for a charge transport layer. The coating liquid was applied onto the above-formed charge generation layer by dipping and dried for 60 min. at 120° C. to form a 20 micron-thick charge transport layer.

The thus-prepared electrophotographic photosensitive member was incorporated in a copying apparatus, and the electrophotographic performances thereof were evaluated by a process wherein steps of charging-exposure-development-transfer-cleaning were repeated at a cycle of 0.8 sec under low temperature-low humidity conditions (15° C.-15% RH). The results are summarized in Table 6 appearing hereinafter.

As is shown in Table 6, the photosensitive member showed a large difference between the dark-part potential $(V_D)$ and light-part potential $(V_L)$, thus providing a sufficient contrast. Further, as a result of 1000 sheets of successive image formation, images could be formed in a very stable state without causing an increase in light-part potential $(V_L)$.

EXAMPLES 2—2-2—4 electrophotographic photosensitive members were prepared in the same manner as in Example 2-1 except that the following compositions were respectively used for preparing the intermediate layers.

| [Example 2-2] | |
|---|---|
| Phosphated polyol compound B | 8.5 part(s) |
| 2,4-TDI | 11.5 part(s) |
| DBTL | 0.02 part(s) |
| MEK | 80 part(s) |

| [Example 2-3] | |
|---|---|
| Phosphated polyol compound C | 9.8 part(s) |
| HMDI in a blocked form with methyl ethyl ketoxime (MEKO) | 10.2 part(s) |
| DBTL | 0.02 part(s) |
| MEK | 80 part(s) |

| [Example 2-4] | |
|---|---|
| Phosphated polyol compound D | 3.2 part(s) |
| Poly(oxyethylene)triol (Mn = 3000) | 12.9 part(s) |
| MDI | 3.9 part(s) |
| DBTL | 0.02 part(s) |
| MEK | 80 part(s) |

The above-prepared photosensitive members were evaluated in the same manner as in Example 2-1. As a result, the respective photosensitive members showed a large difference between dark-part potential ($V_D$) and light-part potential ($V_L$), thus providing a sufficient potential contrast. Further, as a result of 1000 sheets of successive image formation, the respective photosensitive members provided images in a very stable state while causing almost no increase in light-part potential ($V_L$).

The results are also summarized in Table 6.

EXAMPLE 2-5

| Phosphated polyol compound E | 76 parts |
|---|---|
| 2,6-TDI | 24 parts |

The above ingredients were reacted under stirring for 4 hours at 90° C. to form a reaction product (polymer).

| The above reaction product | 10 parts |
|---|---|
| MEK | 60 parts |
| Dichloromethane | 30 parts |

A coating liquid was prepared by mixing the above ingredients, and an electrophotographic photosensitive member was prepared in the same manner as in Example 2-1 except that the coating liquid was used for preparing the intermediate layer.

The thus-prepared photosensitive member was evaluated in the same manner as in Example 2-1. As a result, the photosensitive member showed a large difference between dark-part potential ($V_D$) and light-part part potential ($V_L$), thus providing a sufficient potential contrast. Further, as a result of 1000 sheets of successive image formation, the photosensitive member provided images in a very stable state while causing almost no increase in light-part potential ($V_L$).

The results are also shown in Table 6.

COMPARATIVE EXAMPLES 2-1 AND 2-2

Electrophotographic photosensitive members were prepared in the same manner as in Example 2-1 except that the following compositions were respectively used for preparing the intermediate layers.

| [Comparative Example 2-1] | |
|---|---|
| Alcohol-soluble copolymer nylon ("Amilan CM-8000", mfd. by Toray K.K.) | 5 part(s) |
| Methanol | 95 part(s) |

| [Comparative Example 2-2] | |
|---|---|
| Polyester polyol ("Nippolan 125", mfd. by Nihon Polyurethane Kogyo K.K.) | 14 part(s) |
| 2,6-TDI | 6 part(s) |
| DBTL | 0.02 part(s) |
| MEK | 80 part(s) |

The photosensitive members were evaluated in the same manner as in Example 2-1. As a result, both photosensitive members showed an increase in light-part potential ($V_L$), thus resulting in images accompanied with fog after 1000 sheets of successive copying.

The results are also summarized in Table 6 below.

Separately, the intermediate layers were formed according to the above-described methods of Examples 2-1-2-5 and Comparative Examples 2-1 and 2—2, and the adhesion strengths thereof were evaluated by a square matrix pattern (or checker pattern) peeling test according to JIS K5400 (General test method for paints).

As a result, the intermediate layers according to Examples 2-1-2-5 were all free from peeling, thus showing good adhesion to the aluminum substrate. On the other hand, the intermediate layers of Comparative Examples 2-1 and 2—2 showed peeling rates of 25% and 29%, respectively.

TABLE 6

| | Initial stage | | After 1000 sheets of successive copying | |
|---|---|---|---|---|
| | Dark-part potential $V_D$ (-V) | Light-part potential $V_L$ (-V) | Light-part potential $V_L$ (-V) | Image evaluation |
| Example | | | | |
| 2-1 | 670 | 175 | 180 | Good |
| 2-2 | 665 | 165 | 195 | Good |
| 2-3 | 660 | 185 | 200 | Good |
| 2-4 | 675 | 160 | 185 | Good |
| 2-5 | 680 | 190 | 195 | Good |
| Comp. Example | | | | |
| 2-1 | 665 | 190 | 325 | Fog occurred |
| 2-2 | 670 | 200 | 360 | Fog occurred |

Example 2-6

| Resol-type phenolic resin | 25 parts |
|---|---|
| Electroconductive titanium oxide powder (coated with tin oxide containing 10% of antimony | 50 parts |

| | |
|---|---|
| oxide) | |
| Methyl cellosolve | 20 parts |
| Methanol | 5 parts |

The above-ingredients were subjected to 2 hours of mixing and dispersion in a sand mill containing 1 mm-dia. glass beads to prepare a paint for a first intermediate layer.

The paint was applied onto an aluminum cylinder (OD=30 mm, L=260 mm) by dipping and then dried and cured at 140° C. for 30 min. to form a 20 micron-thick first intermediate layer.

| | |
|---|---|
| Phosphated polyol compound A | 11.0 part(s) |
| 2,4-TDI in a blocked form with MEKO | 9.0 part(s) |
| DBTL | 0.02 part(s) |
| MEK | 80 part(s) |

The above ingredients were dissolved in mixture to form a paint for a second intermediate layer, which was then applied by dipping onto the first intermediate layer and dried and cured at 150° C. for 20 min. to form a 0.6 micron-thick second intermediate layer.

Then, 3 parts of a disazo pigment of the formula:

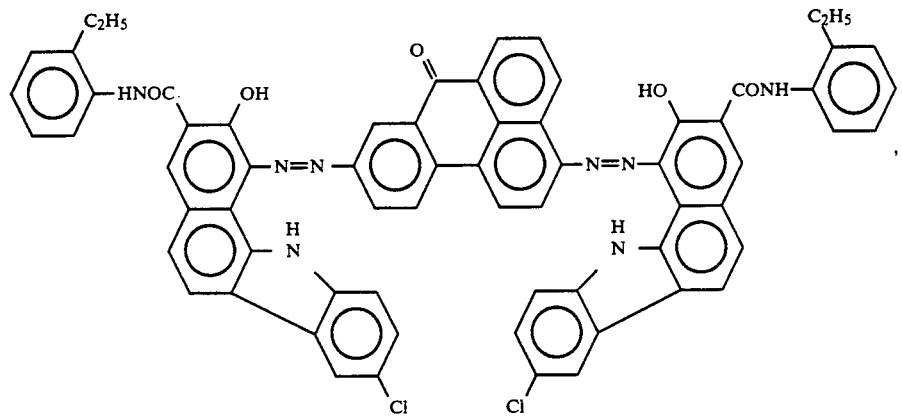

2 parts of polyvinyl benzal (benzal degree=80%, Mw=11000) and 35 parts of cyclohexanone were subjected to 12 hours of mixing and dispersion by a sand mill containing 1 mm-dia. glass beads and further dispersed after adding 60 parts of methyl ethyl ketone (MEK) to form a coating liquid for a charge generation layer. The coating liquid was applied by dipping onto the above second intermediate layer and dried at 80° C. for 20 min. to form a 0.2 micron-thick charge generation layer.

Then, 10 parts of a styryl compound of the formula:

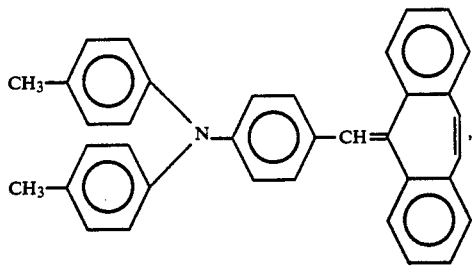

10 parts of a bisphenol Z-type polycarbonate (Mw=30000), 15 parts of dichloromethane and 45 parts of monochlorobenzene were dissolved in mixture to form a coating liquid for a charge transport layer. The coating liquid was applied onto the above-formed charge generation layer by dipping and dried for 60 min. at 120° C. to form a 18 micron-thick charge transport layer.

The thus-prepared electrophotographic photosensitive member was incorporated in a laser printer of the reversal development type, and the electrophotographic performances thereof were evaluated by a process wherein steps of charging-exposure-development-transfer-cleaning were repeated at a cycle of 1.5 sec under normal temperature-normal humidity conditions (23° C.-50% RH) and high temperature-high humidity conditions (30° C.-85% RH). The results are summarized in Table 7 appearing hereinafter.

As is shown in Table 7, the photosensitive member showed a large difference between the dark-part potential ($V_D$) and light-part potential ($V_L$), thus providing a sufficient contrast. Further, also under the high temperature-high humidity conditions, the dark-part potential was stable and good images free from black spots or fog could be formed.

EXAMPLES 2-7-2-10

Electrophotographic photosensitive members were prepared in the same manner as in Example 2-6 except that the following compositions were respectively used for preparing the second intermediate layers.

| [Example 2-7] | |
|---|---|
| Phosphated polyol compound F | 14.0 part(s) |
| HMDI in a phenol-blocked form | 6.0 part(s) |
| DBTL | 0.02 part(s) |

[Example 2-7]

| | |
|---|---|
| MEK | 80 part(s) |

[Example 2-8]

| | |
|---|---|
| Phosphated polyol compound G | 8.7 part(s) |
| MDI in an MEKO-blocked form | 11.3 part(s) |
| MEK | 80 part(s) |

[Example 2-9]

| | |
|---|---|
| Phosphated polyol compound A | 8.0 part(s) |
| Phosphated polyol compound K | 5.4 part(s) |
| 2,6-TDI in an MEKO-blocked form | 6.6 part(s) |
| DBTL | 0.04 part(s) |
| MEK | 80 part(s) |

[Example 2-10]

| | |
|---|---|
| Phosphated polyol compound H | 13.4 part(s) |
| HMDI in a trimerized form isocyanurate | 6.6 part(s) |
| Stannous octylate | 0.02 part(s) |
| MEK | 80 part(s) |

The above-prepared photosensitive members were evaluated in the same manner as in Example 2-6. As a result, each photosensitive member maintained a stable dark-part potential ($V_D$) even under high temperature-high humidity conditions and could provide good images free from occurrence of black spots or fog.

The results are summarized in Table 7.

COMPARATIVE EXAMPLES 2-3-2-5

Electrophotographic photosensitive members were prepared in the same manner as in Example 6 except that the following compositions were respectively used for preparing the second intermediate layers.

[Comparative Example 2-3]

| | |
|---|---|
| N-methoxymethylated 6-nylon (Mw = 50000, methoxymethyl-substitution rate = 28%) | 5 part(s) |
| Methanol | 95 part(s) |

[Comparative Example 2-4]

| | |
|---|---|
| Poly(oxypropylene)triol (hydroxyl value = 170 mg KOH/g) | 15 part(s) |
| 2,4-TDI | 5 part(s) |
| DBTL | 0.02 part(s) |
| MEK | 80 part(s) |

[Comparative Example 2-5]

| | |
|---|---|
| Poly(oxyethylene)glycol (hydroxyl value = 37.5 mg KOH/g) | 15 part(s) |
| 2,6-TDI in an MEKO-blocked form | 5 part(s) |
| DBTL | 0.02 part(s) |
| MEK | 80 part(s) |

The photosensitive members were evaluated in the same manner as in Example 2-6. As a result, the photosensitive member according to Comparative Example 2-3 showed a decrease in chargeability to lower the dark-part potential ($V_D$) under the high temperature-high humidity conditions and also provided images accompanied with black spots and fog. On the other hand, the photosensitive members according to Comparative Examples 2-4 and 2-5 did not show a decrease in chargeability under the high temperature-high humidity conditions, but the resultant images were accompanied with black spots.

The results are summarized in Table 7.

Separately, the intermediate layers were formed according to the above-described methods of Examples 2-6–2-10 and Comparative Examples 2-3 and 2-5, and the adhesion strengths thereof were evaluated by a square matrix pattern (or checker pattern) peeling test according to JIS K5400.

As a result, the intermediate layers according to Examples 2-6–2-10 were all free from peeling, thus showing good adhesion to the aluminum substrate. On the other hand, the intermediate layers of Comparative Examples 2-3 to 2-5 showed peeling rates of 22%, 35% and 31%, respectively.

TABLE 7

| | Environmental conditions | | | |
|---|---|---|---|---|
| | 23° C., 50% RH | | 30° C., 85% RH | |
| | $V_D$ (-V) | $V_L$ (-V) | $V_D$ (-V) | Image |
| Example | | | | |
| 2-6 | 615 | 160 | 610 | Good |
| 2-7 | 630 | 165 | 620 | Good |
| 2-8 | 640 | 170 | 615 | Good |
| 2-9 | 625 | 165 | 615 | Good |
| 2-10 | 615 | 160 | 610 | Good |
| Comparative Example | | | | |
| 2-3 | 635 | 165 | 560 | Black spots and fog occurred |
| 2-4 | 630 | 165 | 610 | Black spots occurred |
| 2-5 | 630 | 180 | 615 | Black spots occurred |

EXAMPLE 2-11

| | |
|---|---|
| Phosphated polyol compound J | 13.1 part(s) |
| 2,6-TDI in MEKO-blocked form | 6.9 part(s) |
| Electroconductive titanium oxide powder (coated with tin oxide containing 8% of artimony oxide) | 20 part(s) |
| Rutile-type titanium oxide powder | 20 part(s) |
| DBTL | 0.02 part(s) |
| MEK | 40 part(s) |

The above-ingredients were subjected to 3 hours of mixing and dispersion in a sand mill containing 1 mm-dia. glass beads to prepare a paint for a first intermediate layer.

The paint was applied onto an aluminum cylinder (OD=60 mm, L=260 mm) by dipping and then dried and cured at 150° C. for 30 min. to form a 15 micron-thick first intermediate layer.

Then, the paint for the second intermediate layer prepared in Example 2-6 was applied by dipping onto the above first intermediate layer, and dried and cured at 150° C. for 20 min. to form a 0.6 micron-thick second intermediate layer.

Then, 4 parts of a disazo pigment of the formula:

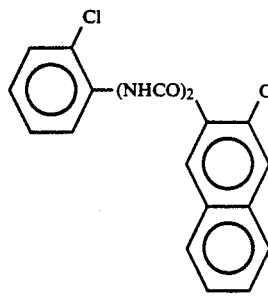 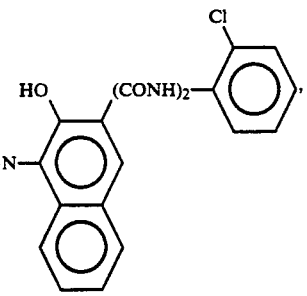

2 parts of polyvinyl butyral (butyral degree=71%, Mw=18000) and 34 parts of cyclohexanone were subjected to 6 hours of mixing and dispersion by a sand mill containing 1 mm-dia. glass beads and further dispersed after adding 60 parts of methyl ethyl ketone (MEK) to form a coating liquid for a charge generation layer. The coating liquid was applied by dipping onto the above second intermediate layer and dried at 80° C. for 15 min to form a 0.3 micron-thick charge generation layer.

Then, the coating liquid for a charge transport layer used in Example 2-6 was applied by dipping onto the charge generation layer and dried at 120° C. for 60 min to form a 22 micron-thick charge transport layer.

The thus-prepared electrophotographic photosensitive member was incorporated in a copying apparatus, and the electrophotographic performances thereof were evaluated by a process wherein steps of charging-exposure-development-transfer-cleaning were repeated at a cycle of 0.6 sec under low temperature-low humidity conditions (10° C.-10% RH). The results are summarized in Table 8 appearing hereinafter.

As is shown in Table 8, the photosensitive member showed a large difference between the dark-part potential ($V_D$) and light-part potential ($V_L$), thus providing a sufficient contrast. Further, as a result of 1000 sheets of successive image formation, images could be formed in a very stable state without causing an increase in light-part potential ($V_L$).

EXAMPLE 2-12

| | |
|---|---|
| Alcohol-soluble copolymer nylon ("Amilan CM-8000", mfd. by Toray K.K.) | 3 parts |
| N-methoxymethylated 6-nylon (Mw = 150000, methoxymethyl substitution rate = 30%) | 3 parts |
| Methanol | 94 parts |

An electrophotographic photosensitive member was prepared in the same manner as in Example 2-11 except that a coating liquid prepared from the above ingredients was used for forming the second intermediate layer.

EXAMPLE 2-13

An electrophotographic photosensitive member was prepared in the same manner as in Example 2-11 except that the second insulating layer was omitted to form on the support a laminated structure composed of the first intermediate layer, the charge generation layer and the charge transport layer.

The above-prepared photosensitive members of Examples 2-12 and 2-13 were evaluated in the same manner as in Example 2-11. As a result, each photosensitive member showed a large difference between the dark-part potential ($V_D$) and light-part potential ($V_L$), thus providing a sufficient potential contrast. Further, as a result of 1000 sheets of successive image formation, the photosensitive members provided images in a very stable state while causing almost no increase in light-part potential ($V_L$).

The results are summarized in Table 8.

COMPARATIVE EXAMPLES 2-6 AND 2-7

| | |
|---|---|
| Resol-type phenolic resin | 20 parts |
| Electroconductive titanium oxide powder (coated with tin oxide containing 8% of antimony oxide) | 20 parts |
| Rutile-type titanium oxide powder | 20 parts |
| Methyl cellosolve | 25 parts |
| Methanol | 15 parts |

A paint for the first intermediate layer was prepared from the above ingredients otherwise in the same manner as in Example 2-11.

Electrophotographic photosensitive members of Comparative Examples 2-6 and 2-7 were prepared in the same manner as in Examples 2-12 and 2-13, respectively, except that the above-prepared paint was used for forming the first intermediate layer.

The photosensitive members were evaluated in the same manner as in Example 2-11. As a result, the photosensitive member of Comparative Example 2-6 caused an increase in light-part potential ($V_L$) after 1000 sheets of successive image formation, thus providing images accompanied with fog.

On the other hand, the photosensitive member of Comparative Example 2-7 having the charge generation layer and charge transport layer directly formed on the first intermediate layer showed only a low dark-part potential ($V_D$) due to insufficient barrier characteristic causing a large charge injection from the support side. As a result, it failed to provide a potential contrast necessary for image formation.

The results are summarized in Table 8.

TABLE 8

| Resin components for intermediate layers | | Initial stage | | After 1000 sheets | |
|---|---|---|---|---|---|
| 1st | 2nd | $V_D$(-V) | $V_L$(-V) | $V_L$(-V) | Image |
| Ex. | | | | | |

TABLE 8-continued

| | Resin components for intermediate layers | | Initial stage | | After 1000 sheets | |
|---|---|---|---|---|---|---|
| | 1st | 2nd | $V_D$ (-V) | $V_L$ (-V) | $V_L$ (-V) | Image |
| 2-11 | Polyether urethane | Polyether urethane | 720 | 155 | 165 | Good |
| 2-12 | Polyether urethane | nylon | 725 | 180 | 195 | Good |
| 2-13 | Polyether urethane | none | 710 | 150 | 155 | Good |
| Comp. Ex. | | | | | | |
| 2-6 | phenolic resin | nylong | 705 | 165 | 295 | Fog occurred |
| 2-7 | phenolic resin | none | 385 | 180 | (evaluation impossible) | |

EXAMPLES 2-14

| | |
|---|---|
| Phosphated polyol compound A | 7.2 part(s) |
| Polyol compound of the following structure: | 9.8 " |
| $CH_2(PO\text{-}1)_a$—H<br>\|<br>$CH(PO\text{-}1)_b$—H<br>\|<br>$CH_2(PO\text{-}1)_c$—H<br>$(a + b + c)/3 = 7.4$<br>$Mw = 4000$ | |
| PO-1 = —CH$_2$—CH—O—<br>      /<br>  CH$_2$—O$\pm$CH$_2$CH$_2$$\rangle_{\overline{z}}$CH$_3$ | |
| HMDI | 3.6 " |
| DBTL | 0.02 " |
| MEK | 80 " |

The above ingredients were mixed with each other to prepare a paint for an intermediate layer.

The paints was applied onto an aluminum cylinder (OD=30 mm, L=360 mm) by dipping and then dried and cured at 150° C. for 30 min. to form a 3.0 μm-thick intermediate layer.

The, 4 parts of a titanyl oxyphthalocyanine pigment of the following formula:

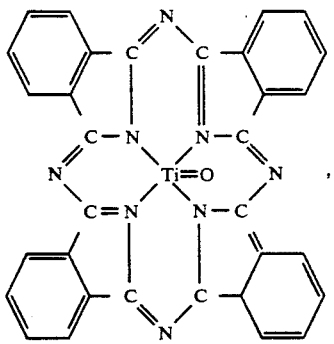

2 parts of polyvinyl butyral (butyral degree=68% , Mw=24000) and 34 parts of cyclohexanone were mixed and dispersed with each other for 8 hours in a sand mill containing 1 mm-dia. glass beads and then diluted with 60 parts of tetrahydrofuran to form a coating liquid for a charge generation layer. The coating liquid was applied by dipping onto the above intermediate layer and dried at 80° C. for 15 hours to form a 0.2 micron-thick charge generation layer.

Then, 4 parts of a triphenylamine derivative of the following formula:

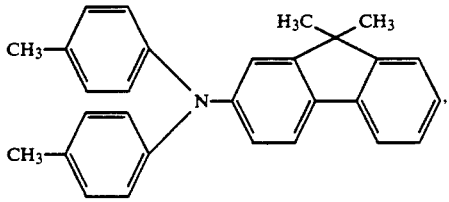

10 parts of polycarbonate Z (Mw=30,000), 10 parts of dichloromethane and 50 parts of monochlorobenzene were mixed with each other to form a coating liquid for a charge transport layer.

The coating liquid was applied onto the above charge generation layer and dried at 120° C. for 60 min to form a 20 micron-thick charge transport layer.

The thus-prepared electrophotographic photosensitive member was incorporated in a copying apparatus, and the electrophotographic performances thereof were evaluated by a process wherein steps of charging-exposure-transfer-cleaning were repeated at a cycle of 0.8 sec. under low temperature-low humidity conditions (15° C.-15% RH). The results are summarized in Table 9 appearing hereinafter.

As is shown in Table 9, the photosensitive member showed a large difference between the dark-part potential ($V_D$) and light-part potential ($V_L$), thus providing a sufficient contrast. Further as a result of 1000 sheets of successive image formation, images could be formed in a very stable state without causing an increase in light-part potential ($V_L$).

EXAMPLES 2-15

| | |
|---|---|
| Phosphated polyol compound B | 4.3 part(s) |
| Polyol compound of the following structure: | 9.1 " |
| $CH_2(PO\text{-}2)_d$—H<br>\|<br>$CH(PO\text{-}2)_e$—H<br>\|<br>$CH_2(PO\text{-}2)_f$—H<br>$(d + e + f)/3 = 2.6$<br>$Mw = 2800$ | |
| PO-2 = —CH$_2$—CH—O—<br>      /<br>  CH$_2$—O$\pm$CH$_2$CH$_2$O$\rangle_{\overline{3}}$C$_4$H$_9$ | |
| 2,4-TDI | 6.7 " |
| DBTL | 0.02 " |

| | |
|---|---|
| -continued | |
| MEK | 80 " |

The above ingredients were mixed with each other to prepare a paint for an intermediate layer.

A photosensitive member was prepared and evaluated in the same manner as in Example 2-14 except that the intermediate layer was formed by using the above paint. The results are also shown in Table 9.

EXAMPLES 2-16

| | |
|---|---|
| Phosphated polyol compound C | 4.9 part(s) |
| Polyol compound of the following structure: | 6.4 " |
| $CH_2(PO-3)_g$—H | |
| $\|$ | |
| $CH(PO-3)_h$—H | |
| $\|$ | |
| $CH_2(PO-3)_i$—H | |
| (g + h + i)/3 = 1.1 | |
| Mw = 700 | |
| PO-3 = —$CH_2$—CH—O— | |
| 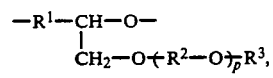 | |
| HMDI in an MEKO-blocked form | 8.7 " |
| DBTL | 0.02 " |
| MEK | 80 " |

The above ingredients were mixed with each other to prepare a paint for an intermediate layer.

A photosensitive member was prepared and evaluated in the same manner as in Example 2-14 except that the intermediate layer was formed by using the above paint. The results are also shown in Table 9.

EXAMPLE 2-17

| | |
|---|---|
| Resol-type phenolic resin | 25 parts |
| Electroconductive titanium oxide powder (coated with tin oxide containing 10% of antimony oxide) | 50 parts |
| Methyl cellosolve | 20 parts |
| Methanol | 5 parts |

The above-ingredients were subjected to 2 hours of mixing and dispersion in a sand mill containing 1 mm-dia. glass beads to prepare a paint for a first intermediate layer.

The paint was applied onto an aluminum cylinder (OD=30 mm, L=860 mm) by dipping and then dried and cured at 140° C. for 30 min. to form a 20 micron-thick first intermediate layer.

Then, the paint for an intermediate layer prepared in Example 1-14 was applied by dipping onto the above first intermediate layer to form a 3.0 μm-thick second intermediate layer.

A charge generation layer and a charge transport layer were formed successively on the second intermediate layer in the same manner as in Example 2-14 to prepare a photosensitive member, which was then evaluated in the same manner as in Example 2-14. The results are also shown in Table 9.

TABLE 9

| | Resin components for intermediate layers | | Initial stage | | After 1000 sheets | |
|---|---|---|---|---|---|---|
| Ex. | 1st | 2nd | $V_D$ (-V) | $V_L$ (-V) | $V_L$ (-V) | Image |
| 2-14 | Polyether urethane | none | 725 | 110 | 125 | Good |
| 2-15 | Polyether urethane | none | 725 | 105 | 105 | Good |
| 2-16 | Polyether urethane | none | 720 | 115 | 125 | Good |
| 2-17 | Phenolic resin | Polyether urethane | 725 | 105 | 105 | Good |

As described above, the electrophotographic photosensitive member according to the present invention having an intermediate layer comprising a reaction product of a polyol compound ([I] and/or [II]) and a polyisocyanate compound can retain a stable potential characteristic and thus stably form good images over wide environmental conditions ranging from low temperature-low humidity to high temperature-high humidity conditions.

What is claimed is:

1. An electrophotographic photosensitive member, comprising: an electroconductive support, and an intermediate layer and a photosensitive layer disposed in this order on the support, wherein said intermediate layer comprises a reaction product of a polyol compound comprising at least one of a polyol compound [I] represented by Formula (1) shown below and a phosphated polyol compound with a polyisocyanate compound:

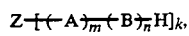   Formula (1)

wherein A denotes $$-R^1-CH-O-$$
$$\phantom{xx}\|$$
$$\phantom{xx}CH_2-O(R^2-O)_pR^3,$$

B denotes —$R^4$—O—, A and B may be connected at random or in blocks with each other, Z denotes an active hydrogen compound residue; $R^1$ is an alkylene group having 1-9 carbon atoms; $R^2$ is an alkylene group having 1-10 carbon atoms; $R^3$ is an alkyl group, alkenyl group, aryl group or aralkyl group having 1-20 carbon atoms; $R^4$ is an alkylene group having 2-10 carbon atoms; k is a number of 1-12; m is a number of 1-250; n is a number of 0-100; and p is a number of 0-5.

2. A photosensitive member according to claim 1, wherein said polyol compound [I] is a reaction product of an active hydrogen compound with at least a glycidyl ether.

3. A photosensitive member according to claim 2, wherein said active hydrogen compound is at least one member selected from the group consisting of polyhydric alcohols, amines and polyhydric phenols, and said glycidyl ether is a compound represented by the following formula (2):

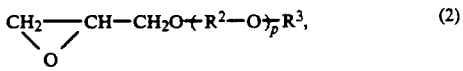

wherein $R^2$ is an alkylene group having 1-10 carbon atoms; $R^3$ is an alkyl group, alkenyl group, aryl group or aralkyl group having 1-20 carbon atoms; and p is a number of 0-5.

4. A photosensitive member according to claim 1, wherein said polyol compound [I] is a reaction product of an active hydrogen compound with a glycidyl ether and an alkylene oxide having 2-10 carbon atoms.

5. A photosensitive member according to claim 4, wherein said alkylene oxide is at least one compound selected from the group consisting of ethylene oxide, propylene oxide, butylene oxide, hexene oxide, cyclohexene oxide and nonene oxide.

6. A photosensitive member according to claim 1, wherein said phosphated polyol compound is a phosphated product of a polyoxyalkylene polyol which has been obtained by polymerizing an alkylene oxide having 2-10 carbon atoms together with an active hydrogen compound.

7. A photosensitive member according to claim 6, wherein said polyoxyalkylene polyol has a number-average molecular weight of 200-10,000.

8. A photosensitive member according to claim 6, wherein said active hydrogen compound is at least one member selected from the group consisting of polyhydric alcohols, amines and polyhydric phenols.

9. A photosensitive member according to claim 6, wherein said alkylene oxide is at least one compound selected from the group consisting of ethylene oxide, propylene oxide, butylene oxide, hexene oxide, cyclohexene oxide and nonene oxide.

10. A photosensitive member according to claim 6, wherein said phosphated polyol compound has a hydroxyl value of 10-2000 mgKOH/g.

11. A photosensitive member according to claim 1, wherein said polyisocyanate compound is at least one member selected from the group consisting of 2,4-toluene diisocyanate, 2-6-toluene diisocyanate, 4,4'-diphenylmethane diisocyanate, hexamethylene diisocyanate, isophorone diisocyanate, and mixtures and adducts thereof.

12. A photosensitive member according to any one of claims 1, 4, 6 and 10, wherein said polyol compound and polyisocyanate compound are reacted in a functional group molar ratio of NCO/OH in the range of 1/1-2/1.

13. A photosensitive member according to claim 1, wherein said intermediate layer has a thickness of 0.1-50 microns.

14. A photosensitive member according to claim 1, wherein said intermediate layer contains an electroconductive substance.

15. A photosensitive member according to claim 1, wherein said photosensitive layer has a laminated structure including an organic charge generation layer and a charge transport layer.

16. An electrophotographic unit, comprising: a electrophotographic photosensitive member, and at least one member selected from the group consisting of a charging means, a developing means and a cleaning means and integrally supported together with the photosensitive member to form a single unit which can be connected to or released from an apparatus body as desired; said electrophotographic photosensitive member comprising an electroconductive support, and an intermediate layer and a photosensitive layer disposed in this order on the support, wherein said intermediate layer comprises a reaction product of a polyol compound comprising at least one of a polyol compound [1] represented by Formula (1) shown below and a phosphated polyol compound with a polyisocyanate compound:

wherein A denotes

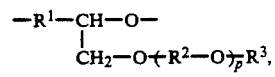

B denotes $-R^4-O-$, A and B may be connected at random or in blocks with each other, Z denotes an active hydrogen compound residue; $R^1$ is an alkylene group having 1-9 carbon atoms; $R^2$ is an alkylene group having 1-10 carbon atoms; $R^3$ is an alkyl group, alkenyl group, aryl group or arlkyl group having 1-20 carbon atoms; $R^4$ is an alkylene group having 2-10 carbon atoms; k is a number of 1-12; m is a number of 1-250; n is a number of 0-100; and p is a number of 0-5.

17. An electrophotographic unit according to claim 16, wherein said polyol compound [I] is a reaction product of an active hydrogen compound with at least a glycidyl ether.

18. An electrophotographic unit according to according to claim 16, wherein said phosphated polyol compound is a phosphated product of a polyoxyalkylene polyol which has been obtained by polymerizing an alkylene oxide having 2-10 carbon atoms together with an active hydrogen compound.

19. An electrophotographic unit according to claim 16, wherein said intermediate layer contains an electroconductive substance.

20. An electrophotographic unit according to claim 16 wherein said photosensitive layer has a laminated structure including an organic charge generation layer and a charge transport layer.

21. An electrophotographic apparatus, comprises: a photosensitive member, a latent image-forming means, a means for developing a latent image and a means for transferring a developed image to a transfer-receiving means; said photosensitive member comprising an electroconductive support, and an intermediate layer and a photosensitive layer disposed in this order on the support, wherein said intermediate layer comprises a reaction product of a polyol compound comprising at least one of a polyol compound [I] represented by Formula (1) shown below and a phosphated polyol compound with a polyisocyanate compound:

wherein A denotes

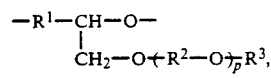

B denotes —$R^4$—O—, A and B may be connected at random or in blocks with each other, Z denotes an active hydrogen compound residue; $R^1$ is an alkylene group having 1-9 carbon atoms; $R^2$ is an alkylene group having 1-10 carbon atoms; $R^3$ is an alkyl group, alkenyl group, aryl group or aralkyl group having 1-20 carbon atoms; $R^4$ is an alkylene group having 2-10 carbon atoms; k is a number of 1-12; m is a number of 1-250; n is a number of 0-100; and p is a number of 0-5.

22. An electrophotographic apparatus according to claim 21, wherein said polyol compound [I] is a reaction product of an active hydrogen compound with at least a glycidyl ether.

23. An electrophotographic apparatus according to claim 21, wherein said phosphated polyol compound is a phosphated product of a polyoxyalkylene polyol which has been obtained by polymerizing an alkylene oxide having 2-10 carbon atoms together with an active hydrogen compound.

24. An electrophotographic apparatus according to claim 21, wherein said intermediate layer contains an electroconductive substance.

25. An electrophotographic apparatus according to claim 21, wherein said photosensitive layer has a laminated structure including an organic charge generation layer and a charge transport layer.

26. A facsimile apparatus, comprising: an electrophotographic apparatus equipped with an electrophotographic photosensitive member and a receiving means for receiving image data from a remote terminal; said electrophotographic photosensitive member comprising an electroconductive support, and an intermediate layer and a photosensitive layer disposed in this order on the support, wherein said intermediate layer comprises a reaction product of a polyol compound comprising at least one of a polyol compound [I] represented by Formula (1) shown below and a phosphated polyol compound with a polyisocyanate compound:

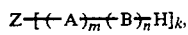  Formula (1)

wherein A denotes

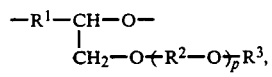

B denotes —$R^4$—O—, A and B may be connected at random or in blocks with each other, Z denotes an active hydrogen compound residue; $R^1$ is an alkylene group having 1-9 carbon atoms; $R^2$ is an alkylene group having 1-10 carbon atoms; $R^3$ is an alkyl group, alkenyl group, aryl group or aralkyl group having 1-20 carbon atoms; $R^4$ is an alkylene group having 2-10 carbon atoms; k is a number of 1-12; m is a number of 1-250; n is a number of 0-100; and p is a number of 0-5.

27. A facsimile apparatus according to claim 26, wherein said polyol compound [I] is a reaction product of an active hydrogen compound with at least a glycidyl ether.

28. A facsimile apparatus according to claim 26, wherein said phosphated polyol compound is a phosphated product of a polyoxyalkylene polyol which has been obtained by polymerizing an alkylene oxide having 2-10 carbon atoms together with an active hydrogen compound.

29. A facsimile apparatus according to claim 26, wherein said intermediate layer contains an electroconductive substance.

30. A facsimile apparatus according to claim 26, wherein said photosensitive layer has a laminated structure including an organic charge generation layer and a charge transport layer.

31. A photosensitive member according to claim 1, wherein said intermediate layer has a laminated structure including plural layers, at least one of which comprises said reaction product.

32. An electrophotographic unit according to claim 16, wherein said intermediate layer has a laminated structure including plural layers, at least one of which comprises said reaction product.

33. A facsimile apparatus according to claim 26, wherein said intermediate layer has a laminated structure including plural layers, at least one of which comprises said reaction product.

34. A photosensitive member according to claim 31, wherein a second intermediate layer is provided between the intermediate layer and the electroconductive support.

35. An electrophotographic unit according to claim 32, wherein a second intermediate layer is provided between the intermediate layer and the electroconductive support.

36. A facsimile apparatus according to claim 33, wherein a second intermediate layer is provided between the intermediate layer and the electroconductive support.

* * * * *

UNITED STATES PATENT AND TRADEMARK OFFICE
CERTIFICATE OF CORRECTION

PATENT NO.   : 5,296,322
DATED        : March 22, 1994
INVENTOR(S)  : TAKASHI KOYAMA, ET AL.

It is certified that error appears in the above-identified patent and that said Letters Patent is hereby corrected as shown below:

COLUMN 1

Line 36, "defects" should read --defects,--.
Line 47, "support" should read --support,--.
Line 51, "quar-" should read --qua- --.

COLUMN 2

Line 9, "a" should read --an--.
Line 13, "Ween" should read --When--.
Line 49, "compound [1]" should read --compound [I]--.

COLUMN 3

Line 8, "DRAWING" should read --DRAWINGS--.
Line 37, "the using" should read --using--.

COLUMN 7

Line 23, "glycerin" should read --glycerine--.

COLUMN 8

Line 38, "compound [1]." should read --compound [I].--.

COLUMN 10

Line 49, "II]," should read --[II],--.
Line 65, "triethylenediamine" should read --triethylenediamine,--.

UNITED STATES PATENT AND TRADEMARK OFFICE
CERTIFICATE OF CORRECTION

PATENT NO. : 5,296,322
DATED : March 22, 1994
INVENTOR(S) : TAKASHI KOYAMA, ET AL.

It is certified that error appears in the above-identified patent and that said Letters Patent is hereby corrected as shown below:

COLUMN 11

Line 24, "electroconductive" should read --electroconductive films--.
    Line 47, "cellulose acetate" should read --cellulose or cellulose acetate--.

COLUMN 14

Line 28, " $\rangle N$ " should read -- $\rangle\!-\!N$ --.
    Line 35, "ofof" should read --of--.

COLUMN 15

Line 25, "No. 2)" should read --No. 2--.
    Line 34, "from" should read --form--.

COLUMN 16

Line 55, close up right margin.
    Line 56, close up left margin.
    Line 66, "29% ," should read --29%,--.

COLUMN 18

Line 1, "degree=80% ," should read --degree=80%,--.
    Line 32, "a" should read --an--.

UNITED STATES PATENT AND TRADEMARK OFFICE
CERTIFICATE OF CORRECTION

PATENT NO. : 5,296,322
DATED : March 22, 1994
INVENTOR(S) : TAKASHI KOYAMA, ET AL.

It is certified that error appears in the above-identified patent and that said Letters Patent is hereby corrected as shown below:

COLUMN 19

Line 50, "Example 6" should read --Example 1-6--.

COLUMN 20

Line 67, "above-ingredients" should read
        --above ingredients--.

COLUMN 22

Line 62, "Charge" should read --charge--.

COLUMN 25

Line 3, "electrophotographic" should read
        --Electrophotographic--.

COLUMN 26

Line 43, "29% ," should read --29%,--.
    TABLE 6, "160" should read --170--.

COLUMN 27

Line 6, "above-ingredients" should read
        --above ingredients--.

COLUMN 28

Line 19, "a" should read --an--.

UNITED STATES PATENT AND TRADEMARK OFFICE
CERTIFICATE OF CORRECTION

PATENT NO. : 5,296,322
DATED : March 22, 1994
INVENTOR(S) : TAKASHI KOYAMA, ET AL.

It is certified that error appears in the above-identified patent and that said Letters Patent is hereby corrected as shown below:

COLUMN 29

Line 39, "Example 6" should read --Example 2-6--.

COLUMN 30

Line 54, "above-ingredients" should read
--above ingredients--.

COLUMN 33

TABLE 8-continued, "nylong" should read --nylon--.
Line 19, "EXAMPLES 2-14" should read --EXAMPLE 2-14--.
Line 32, "$CH_2-O-(CH_2CH_2)_2CH_3$" should read
--$CH_2-O-(CH_2CH_2O)_2CH_3$--.
Line 39, "paints" should read --paint--.
Line 43, "The," should read --Then,--.
Line 67, "15 hours" should read --15 minutes--.

COLUMN 34

Line 47, "Further" should read --Further,--.
Line 52, "EXAMPLES 2-15" should read --EXAMPLE 2-15--.

COLUMN 35

Line 23, "EXAMPLES 2-16" should read --EXAMPLE 2-16--.
Line 36, "$CH_2O$" should read --$CH_2CH_2O$--.

COLUMN 37

Line 62, "a" should read --an--.

UNITED STATES PATENT AND TRADEMARK OFFICE
CERTIFICATE OF CORRECTION

PATENT NO. : 5,296,322
DATED : March 22, 1994
INVENTOR(S) : TAKASHI KOYAMA, ET AL.

It is certified that error appears in the above-identified patent and that said Letters Patent is hereby corrected as shown below:

COLUMN 38

Line 6, "compound [1]" should read --compound [I]--.
Line 43, "16" should read --16,--.
Line 47, "comprises:" should read --comprising:--.

Signed and Sealed this

Twenty-seventh Day of September, 1994

Attest:

BRUCE LEHMAN

Attesting Officer

Commissioner of Patents and Trademarks